(12) United States Patent
Keating, III et al.

(10) Patent No.: US 8,098,275 B2
(45) Date of Patent: Jan. 17, 2012

(54) THREE-DIMENSIONAL IMAGING SYSTEM USING OPTICAL PULSES, NON-LINEAR OPTICAL MIXERS AND HOLOGRAPHIC CALIBRATION

(75) Inventors: John J. Keating, III, Hoboken, NJ (US); Rainer Martini, Hoboken, NJ (US)

(73) Assignee: The Trustees of The Stevens Institute of Technology, Hoboken, NJ (US)

( * ) Notice: Subject to any disclaimer, the term of this patent is extended or adjusted under 35 U.S.C. 154(b) by 1104 days.

(21) Appl. No.: 10/585,157

(22) PCT Filed: Dec. 22, 2004

(86) PCT No.: PCT/US2004/043408
§ 371 (c)(1),
(2), (4) Date: Aug. 9, 2007

(87) PCT Pub. No.: WO2005/065272
PCT Pub. Date: Jul. 21, 2005

(65) Prior Publication Data
US 2008/0012850 A1    Jan. 17, 2008

Related U.S. Application Data

(60) Provisional application No. 60/533,384, filed on Dec. 30, 2003, provisional application No. 60/533,134, filed on Dec. 30, 2003, provisional application No. 60/533,305, filed on Dec. 30, 2003, provisional application No. 60/537,773, filed on Jan. 20, 2004.

(51) Int. Cl.
*H04N 5/89* (2006.01)
*G06T 17/00* (2006.01)
(52) U.S. Cl. .......................... 348/40; 345/424
(58) Field of Classification Search .............. 348/40–42; 345/424
See application file for complete search history.

(56) References Cited

U.S. PATENT DOCUMENTS

| 3,428,393 A | 2/1969 | De Montebello |
| 3,604,780 A | 9/1971 | Martini |

(Continued)

OTHER PUBLICATIONS

International Search Report and Written Opinion of International Searching Authority in connection with Applicants' International Patent Application No. PCT/US2004/043408.

(Continued)

*Primary Examiner* — Jay Au Patel
*Assistant Examiner* — Richard Torrente
(74) *Attorney, Agent, or Firm* — Greenberg Traurig, LLP

(57) ABSTRACT

A three dimensional imaging system is disclosed which includes a three dimensional display (12), three-dimensional calibration equipment (16), and one or more two-dimensional (15) or three dimensional (14) image scanners. The three-dimensional display (12) uses optical pulses (32a-32k) and a non linear optical mixer (18) to display a three-dimensional image (17). The three-dimensional image (17) is generated in voxels of the display volume (28) as the optical mixer (18) sweeps the display volume (28). The three-dimensional calibration equipment (16) uses a hologram projected proximal to a desired object (164) to calibrate optical imaging devices (162a-162c) and to simplify the combination of the images from one or more optical imaging devices (162a-162c) into three-dimensional information. The three-dimensional image scanner (14) employs optical pulses (136, 138) and a non-linear optical mixer (128) to acquire three-dimensional images of a desired object (134). The three-dimensional image scanner (14) captures both the shape and color of a desired object (134).

14 Claims, 27 Drawing Sheets

U.S. PATENT DOCUMENTS

| | | |
|---|---|---|
| 4,160,973 A | 7/1979 | Berlin, Jr. |
| 4,292,523 A | 9/1981 | Hoppe |
| 4,871,231 A | 10/1989 | Garcia, Jr. |
| 4,979,815 A | 12/1990 | Tsikos |
| 5,013,917 A | 5/1991 | Ulich |
| 5,148,301 A | 9/1992 | Sawatsubashi et al. |
| 5,177,752 A | 1/1993 | Ohya et al. |
| 5,451,785 A | 9/1995 | Faris |
| 5,489,984 A | 2/1996 | Hariharan et al. |
| 5,585,913 A | 12/1996 | Hariharan et al. |
| 5,684,621 A | 11/1997 | Downing |
| 5,703,606 A | 12/1997 | Blundell |
| 5,852,700 A | 12/1998 | Caponi et al. |
| 5,870,220 A | 2/1999 | Migdal et al. |
| 5,898,714 A | 4/1999 | Morita et al. |
| 5,936,736 A | 8/1999 | Suzuki et al. |
| 5,936,767 A | 8/1999 | Favalora |
| 5,939,739 A | 8/1999 | O'Keefe |
| 5,943,160 A | 8/1999 | Downing |
| 6,024,496 A | 2/2000 | Shy |
| 6,108,576 A | 8/2000 | Alfano et al. |
| 6,167,295 A | 12/2000 | Cosman |
| 6,177,913 B1 | 1/2001 | Whitesell |
| 6,229,509 B1 | 5/2001 | DeLuca et al. |
| 6,302,542 B1 | 10/2001 | Tsao |
| 6,321,111 B1 | 11/2001 | Perelman et al. |
| 6,445,491 B2 | 9/2002 | Sucha et al. |
| 6,600,168 B1 | 7/2003 | Geng |
| 6,603,778 B1 | 8/2003 | Imasaka |
| 6,654,490 B2 | 11/2003 | Love |
| 6,664,501 B1 | 12/2003 | Troitski |
| 6,724,489 B2 | 4/2004 | Freifeld |
| 6,765,566 B1 | 7/2004 | Tsao |
| 6,816,629 B2 | 11/2004 | Redlich |
| 6,819,869 B2 | 11/2004 | Seo |
| 6,822,748 B2 | 11/2004 | Johnston et al. |
| 2002/0036779 A1* | 3/2002 | Kiyoi et al. ............. 356/606 |
| 2002/0123680 A1* | 9/2002 | Vaillant et al. ........... 600/407 |

OTHER PUBLICATIONS

International Preliminary Report on Patentability issued in connection with Applicants' International Patent Application Serial No. PCT/US2004/43408.

John D. Simon, "Ultrashort Light Pulses", Reviews of Scientific Instruments 60 (12), Dec. 1989, pp. 3597-3624.

Steinmeyer, et al., "Frontiers in Ultrashort Generation: Pushing the Limits in Linear and Nonlinear Optics", Science Magazine, Nov. 19, 1999, pp. 1507-1512.

Paiella, et al., "Self-Mode-Locking of Quantum Cascade Lasers with Giant Ultrafast Optical Nonlinearities", Science Magazine, Dec. 1, 2000, pp. 1739-1742.

Schäfer, et al., "Propagation of Ultra-Short Optical Pulses in Nonlinear Media", pp. 1-22, Dec. 21, 2002.

* cited by examiner

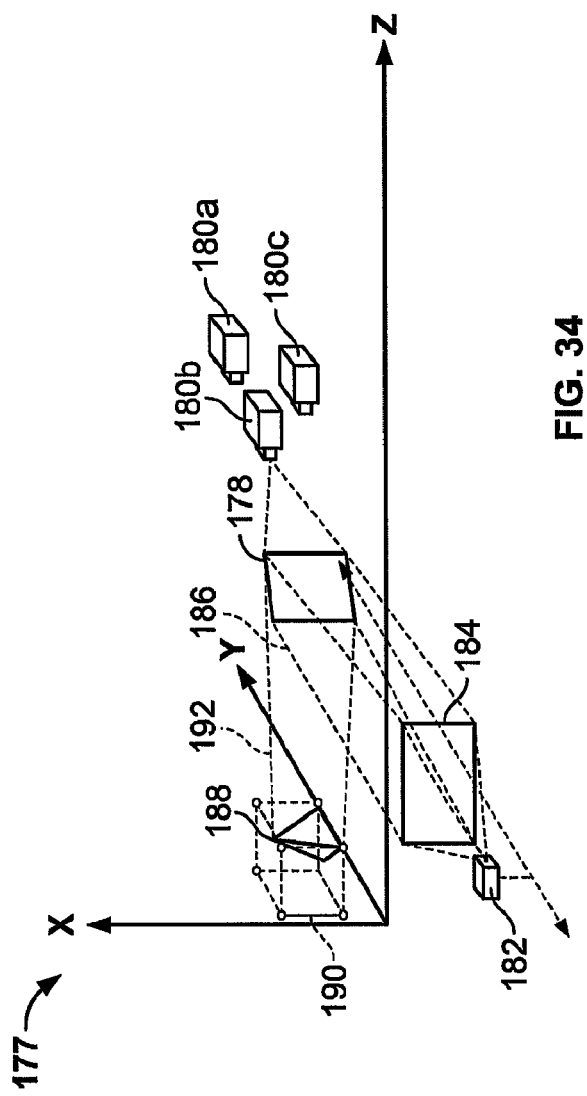
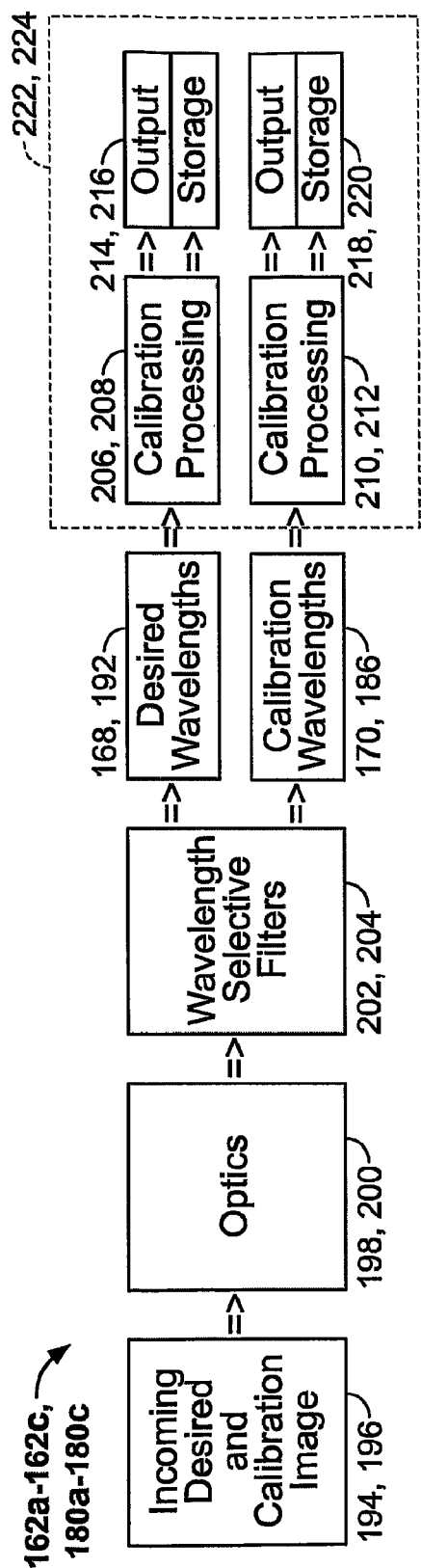
FIG. 34
FIG. 35

THREE-DIMENSIONAL IMAGING SYSTEM USING OPTICAL PULSES, NON-LINEAR OPTICAL MIXERS AND HOLOGRAPHIC CALIBRATION

CROSS-REFERENCE TO RELATED APPLICATION

This application claims the benefit of U.S. Provisional Application Ser. No. 60/533,384 filed Dec. 30, 2003, U.S. Provisional Application Ser. No. 60/533,134 filed Dec. 30, 2003, U.S. Provisional Application Ser. No. 60/533,305 filed Dec. 30, 2003, and U.S. Provisional Application Ser. No. 60/537,773 filed Jan. 20, 2004, the disclosures of which are incorporated herein by reference in their entirety.

FIELD OF THE INVENTION

The present invention relates to three-dimensional imaging, and, more particularly, to an apparatus for providing a three-dimensional imaging system which includes a three-dimensional display, a two-dimensional and/or three-dimensional scanning device, and calibration equipment to calibrate the scanning device(s) and to simplify the combination of the images from one or more two-dimensional optical imaging devices into three-dimensional information. The display and the scanning device(s) both employ optical pulses and non-linear optics to display and record, respectively, a three-dimensional image.

BACKGROUND OF THE INVENTION

In obtaining and displaying images, more information for the viewer can be extracted if the image is three-dimensional rather than two-dimensional. Three-dimensional images provide the viewer with texture, depth, color and position information. Three-dimensional images are more natural for humans to appreciate.

A volumetric three-dimensional imaging system displays images in a display volume which are acquired by a three-dimensional optical scanner or acquired by one or more two-dimensional optical scanners and converted to a three dimensional representation using holographic calibration. Light rays generated by the display at three-dimensional spatial positions appear as real objects to the viewer.

The prior art for three-dimensional displays includes two classes of displays: stereoscopic displays and swept volume "volumetric" displays. Stereoscopic displays are based on holographic or binocular stereoscopic technology that use two-dimensional displays to create a three dimension effect for the viewer. A shortcoming of stereoscopic displays is that they display spatial information from the perspective of only one viewer. Volumetric displays overcome this shortcoming by creating three-dimensional images in the display volume from voxels, the smallest distinguishable three-dimensional spatial element of a three-dimensional image. Volume displays satisfy depth cues such as stereo vision and motion parallax. Motion parallax is that phenomenon that a driver observes from his car when the terrain closer to him moves by faster than the terrain farther away.

In volumetric displays, the display volume is swept by a moving screen. The prior art for flat screen volumetric displays includes the LED arrays described in U.S. Pat. No. 4,160,973 to Berlin (the Berlin '973 patent), the cathode ray sphere displays described in U.S. Pat. No. 5,703,606 to Blundell (the Blundell '606 patent), the laser projection displays described in U.S. Pat. No. 5,148,301 to Batchko (the Batchko '301 patent), and the rotating reflector displays described in U.S. Pat. No. 6,302,542 to Tsao (the Tsao '542 patent). The prior art for curved screens includes the helical screen displays and the Archimedes' Spiral displays described U.S. Pat. No. 3,428,393 to de Montebello (the de Montebello '393 patent).

There are two classes of holographic displays which utilize lasers or electron beams to generate illumination on moving screens of phosphor materials. The first class, which uses a laser or electron beam to excite a phosphor to emit light, includes the displays described in the Batchko '301 patent, the Blundell '606 patent, and U.S. Pat. No. 4,871,231 to Garcia (the Garcia '231 patent). The second class uses intersecting lasers beams to generate illumination on moving screen using two stage excitement of photoluminescent media as described in U.S. Pat. No. 5,943,160 to Downing et al. (the Downing et al. '160 patent) or photoionization of silicate Glasses as described in U.S. Pat. No. 6,664,501 to Troitski (the Troitski '501 patent). The problem in both holographic display classes is the need for a high refresh rate of the voxels for real time displays. For a low resolution display of 500 by 500 by 500 voxels, with 20 refreshes each second to enable persistence of vision, data rates of several hundred megahertz to several gigahertz are required to refresh the display. High resolution (high definition) three dimensional display data rates are greatly reduced when voxels in the display can be accessed randomly without raster scanning and also when multiple voxels in the display can be accessed in parallel.

Another approach to color three-dimensional volumetric displays is the use of rotating light sources. Fiber optics implementations using this approach include the implementations described in U.S. Pat. No. 4,294,523 to Woloshuk et al. (the Woloshuk et al. '523 patent) and in U.S. Pat. No. 3,604,780 to Martin (the Martin '780 patent), which channel light using fiber optics to the moving screen. The rotating light source approach has problems connecting a large number of light sources to a moving screen and therefore their high definition displays are difficult to construct and maintain in operation. Implementations utilizing light sources on the moving screen such as the light emitting diodes (LEDs) of the Berlin '973 patent result in complex implantations of light emitters and their associated active control electronics which are also included with the rotating screen.

Yet another approach to color three-dimensional volumetric displays uses projection techniques to display whole two-dimensional images on a moving screen such as a rotating reflector on a reciprocating screen (see the Tsao '542 patent). While this approach has the advantage of high simultaneous transfer of image data to moving screen, its moving mechanism becomes mechanically more complicated as the size and thus the forces for moving the display increases. Furthermore, the accuracy of positioning of the projections in specific voxels decreases as the size of the display increases because of the increasing forces on the rotating screen and because the pointing error of the projection beams increases as display size increases.

The calibration of three-dimensional image acquisition equipment which includes optical recorders, especially for those configurations using multiple cameras, is a very time consuming process, as they require calibration for all the points in the target space. The techniques for combining the information from two-dimension sources into three-dimensional content are well known (see for instance, U.S. Pat. No. 6,816,629 to Redlich). The techniques for moving physical calibration objects to obtain a sufficient number of points to calibrate the target space are also well known (see for instance, U.S. Pat. No. 6,822,748 to Johnston et al). Current calibration techniques using real objects moved through all the calibration points of the target space do not provide continuous real time calibration since optical properties of the optical recorders change with zoom adjustments, wear, or mechanical deformation under acceleration.

The prior art describes three-dimensional image scanners which capture shapes of objects in the target space (see, for instance, U.S. Pat. No. 5,936,739 to Cameron, U.S. Pat. No. 5,585,913 to Hariharan, and U.S. Pat. No. 6,445,491 to Sucha). Such three-dimensional image scanners are not able to capture both shape and color.

SUMMARY OF THE INVENTION

The present invention overcomes the disadvantages and shortcomings of the prior art discussed above by providing a three-dimensional imaging system, which includes a three-dimensional display, an image scanning device for capturing a three-dimensional image to be displayed on the three-dimensional display, and three-dimensional calibration equipment for calibrating the image scanning device. Both the three-dimensional display and the image scanning device employ optical pulses and non-linear optics to display and record, respectively, a three-dimensional image. The image scanning device may be two-dimensional or three-dimensional.

The three-dimensional display includes at least three pulsed optical sources; and an optical mixer movable in a display space, wherein the at least three pulsed optical sources are spatially separated so as to permit pulses emanating therefrom to overlap in a voxel within the display space and intersecting the optical mixer at a selected position, whereby a first-order non-linear interaction of the pulses causes the optical mixer to produce at least one pre-determined wavelength of electromagnetic waves.

The three-dimensional image scanner captures a three-dimensional image of an object. The three-dimensional image scanner includes a first pulsed optical source for generating an illuminating optical pulse at an illumination wavelength, the first pulsed optical source directing the illuminating optical pulse toward the object; a second pulsed optical source for generating a gating optical pulse at a gating wavelength; an optical mixer positioned to receive light reflected from the object at the illumination wavelength in response to interaction of the illuminating optical pulse with the object, a portion of the illuminating optical pulse and a portion of the gating optical pulse spatially and temporally overlapping each other within the optical mixer, thereby producing an optical pulse indicative of the shape of the object; and an optical recorder having a first set of pixels having an associated filter which passes the optical pulse a second set of pixels being unfiltered which capture the color, shading, and texture of the desired object.

The three-dimensional calibration equipment includes acquiring means for acquiring an optical image of a desired object from at least two positions, the acquiring means being either at least two optical recorders placed at least two different positions or a single optical recorder that is moved between several positions. The three-dimensional calibration equipment also includes a holographic calibration plate placed between the acquiring means and the desired object, and a light source of at least one of a set of calibration wavelengths for illuminating the holographic calibration plate so as to project at least one virtual calibration pattern in the field of view of the acquiring means and in the vicinity of the desired object. An alternative embodiment of the three-dimensional calibration equipment includes at least two optical recorders and a light source of at least one of a set of calibration wavelengths for illuminating at least three reference points relative to the desired object to be recorded by the at least two optical recorders.

A method for calibrating the three-dimensional imaging system using the three-dimensional imaging equipment mentioned above includes the steps of projecting a virtual calibration pattern in the field of view of the optical recorder(s); choosing one position of one optical recorder as a reference position; assigning coordinates of a coordinate system relative to either the virtual calibration pattern or the reference position; measuring the differences in the virtual calibration pattern from a second position of the optical recorder(s); calculating calibration corrections relative to the reference position based on the differences measured; and adjusting the images from the optical recorder(s) based on the calibration corrections.

An alternative method of calibrating a three-dimensional imaging system using the three-dimensional imaging equipment mentioned above for calibrating optical recorder(s) includes the steps of projecting a calibration pattern at a calibration wavelength on a plane that is tangent to the nearest point of a desired object as measured from the optical recorder; labeling an intersection point P between the calibration pattern and the desired object; positioning a laser light beam operating at the calibration wavelength at the point P; measuring the distance from the point P to the calibration pattern; generating a second calibration pattern at a greater distance from the reference optical recorder; and repeating the steps of labeling, positioning, and measuring when the calibration pattern intersects the desired object.

Another alternative method of calibrating a three-dimensional imaging system using the three-dimensional imaging equipment mentioned above which includes at least two optical recorders to be calibrated and two holographic calibration plates placed in the field of view of a respective one of the optical recorders where each of the holographic calibration plates contains the same hologram, includes the steps of positioning the calibration plates relative to each other to approximate a monolithic calibration plate; projecting a calibration pattern in the field of view of a desired object through each of the calibration plates; determining the position of at least three reference points in the vicinity of the desired object relative to each of the optical recorders; determining a corresponding position on the calibration pattern corresponding to each reference point; determining the misalignment of the virtual calibration pattern; determining the correction factors as a function of position of the desired object relative to each optical recorder; and applying the correction factors to each optical recorder.

Further features and advantages of the invention will appear more clearly on a reading of the following detailed description of several exemplary embodiments of the invention.

BRIEF DESCRIPTION OF THE DRAWINGS

For a more complete understanding of the present invention, reference is made to the following detailed description of several exemplary embodiments considered in conjunction with the accompanying drawings, in which:

FIG. 34 is a schematic diagram of a second exemplary embodiment of the three-dimensional calibration equipment depicted in FIGS. 1 and 28, in which a mirror is placed in the field of view of the optical recorders;

FIG. 35 is a block diagram depicted the optics/electronics/software for use with the embodiments of FIGS. 28 and 34;

DETAILED DESCRIPTION OF THE INVENTION

Figure 1:
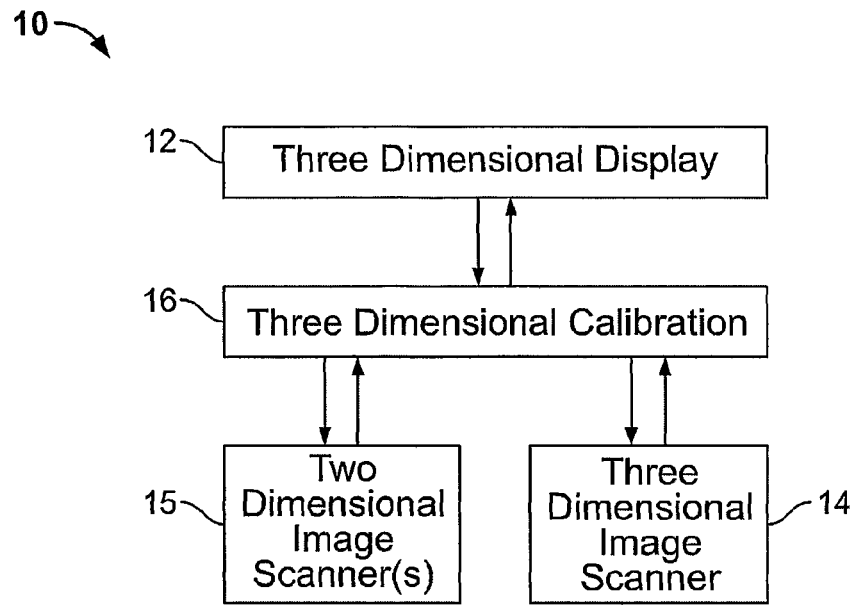
FIG. 1 is a block diagram of a three-dimensional imaging system constructed in accordance with an exemplary embodiment of the present invention.

With reference to FIG. 1, a block diagram of a complete three-dimensional imaging system 10 is depicted. The three-dimensional imaging system 10 includes a three-dimensional display 12, a three-dimensional image scanning device 14, and/or one or more two-dimensional image scanning devices 15, and three-dimensional calibration equipment 16. The three-dimensional image scanning device 14 and/or the two-dimensional image scanning device 15 are employed to generate a three-dimensional image (not shown) to be displayed on the three-dimensional display 12, and to provide data for use by the three-dimensional calibration equipment 16. The three-dimensional calibration equipment 16 calibrates the three-dimensional image scanning device 14 and/or the two-dimensional image scanning device 15. The three-dimensional display 12 and the three-dimensional image scanning device 14 both employ optical pulses and non-linear optics (not shown) to display and record, respectively, a three-dimensional image.

For the purposes of the discussion below, "voxels" are volume pixels, the smallest distinguishable three-dimensional spatial element of a three-dimensional image. "Desired wavelengths" are the visible wavelengths of light to be displayed to the observer. "Cone of acceptance" or "acceptance angle" refers to the range of angles incident on a non-linear optical material from a line perpendicular to the material within which an incident optical pulse will produce non-linear optical pulses that exit the non-linear optical material. Incident angles outside the range of the cone of acceptance will result in no conversion of light and hence no output light emanating from the non-linear optical material.

Figure 2:
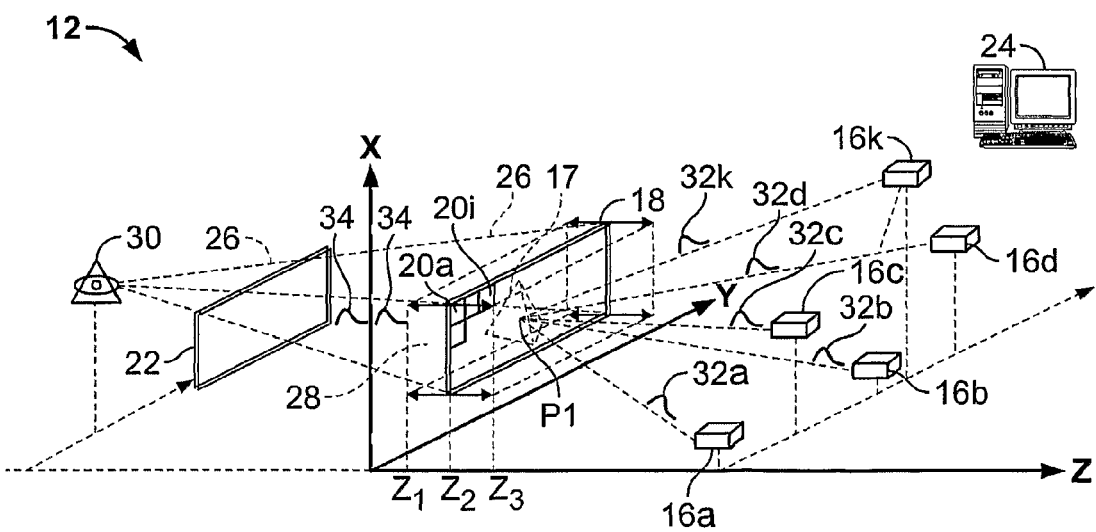
FIG. 2 is a schematic diagram of an exemplary embodiment of the three-dimensional display described in FIG. 1.

With reference to FIG. 2, an exemplary embodiment of the three-dimensional display 12 of the present invention is depicted. The three-dimensional display 12 renders for viewing a three-dimensional image of a desired object 17 at a single optical wavelength (monochrome) or multiple optical wavelengths, including the visible wavelengths (colors). The three-dimensional display 12 can be adapted to display still or moving three-dimensional frames of still or moving desired objects 17. The three-dimensional display 12 includes K pulsed optical sources 16a-16k, an optical mixer 18 including one or more optical mixer elements 20a-20i, one or more optical filters 22, and display electronics 24.

The three-dimensional display 12 uses the optical mixer 18 to create the desired wavelengths 26 in a display volume 28 under the control of the display electronics 24. The optical mixer 18 produced the desired wavelengths 26 at specific voxels (not shown) at specific times within the display volume 28. The optical mixer 18 creates three-dimensional images, which includes graphics, in the display volume 28. Three-dimensional images are generated as the optical mixer 18 emits specific desired wavelengths 26 in selected voxels (not shown). The optical mixer 18 converts the optical excitation from the K pulsed optical sources 16a-16k into the desired wavelengths 26 observable by the viewer(s) or viewing equipment 30 through one or more optical filters 22 of the three-dimensional display 12.

Figure 3:
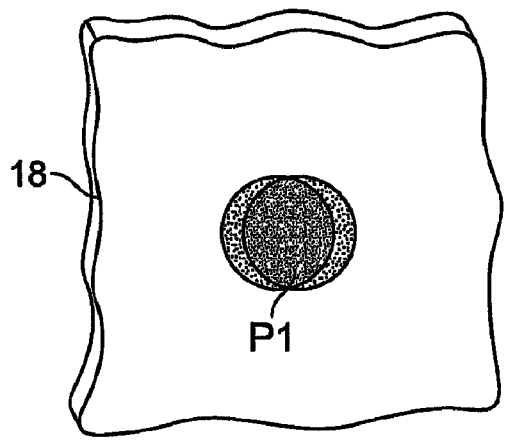
FIG. 3 is a schematic diagram showing that if optical pulses used in FIG. 2 are sufficiently short in duration, then the pulses will spatially overlap essentially at a desired position P1.

For the viewer 30 to observe the full set of visible colors P1 (at least three primary colors) at the point P1, three or more, up to K, pulsed optical sources 16a-16k, may be operable at a given time, which produce optical pulses 32a-32k spatially positioned on one or both sides of the optical mixer 18. In the preferred embodiment, three pulsed optical sources 16a-16c emit the optical pulses 32a-32c of frequencies $F_1$, $F_2$, and $F_3$ toward the optical mixer 18. The optical pulses 32a-32c are sufficiently separated to enable triangulation of the overlap of the optical pulses 32a-32c by pulse timing under the control of the display electronics 24. The optical pulses 32a-32c arrive at a desired point P1 (voxel(s)) in three-dimensional display volume together with the optical mixer 18. The optical pulses 32a-32c are sufficiently short in duration so that they temporally coincide (i.e., spatially overlap; see FIG. 3) essentially at the desired position $P_1$. At all other points on the optical mixer 18, the optical pulses 32a-32c arrive at different times, and do not overlap. The pulse timing is controlled by the display electronics 24.

The optical pulses 32a-32c interact in a non-linear manner when passing through the optical mixer 18. What emanates from the optical mixer 18 is a set of pulses 34 that include pulses of not only the original frequencies $F_1$, $F_2$, and $F_3$ but also pulses of the sum and difference frequencies of the optical pulses 32a-32c. This set of pulses 34 are transmitted through the optical filter(s) 22 to the viewer 30, which may be a person or optical equipment such as a camera. In the case where the pulsed optical sources 16a-16c are frequency tunable or frequency selectable pulsed optical sources, a judicious selection of the frequencies for $F_1$, $F_2$, and $F_3$ produces an output pulse 34 from the optical mixer 18 of a specified optical frequency (color if a visible frequency). The optical filter 22 can be selected to pass only the sum frequency $F_1+F_2+F_3$ such that the viewer 30 "sees" only a pulse 34 of frequency $F_1+F_2+F_3$ illuminated at point P1. Alternatively, selectively choosing $F_1$, $F_2$, and $F_3$, and selectively choosing the upper and lower cutoff frequencies of the optical filter 22 to be within a selected range of the optical spectrum allows the three-dimensional display 12 to display a specific range of frequencies (e.g., the visible colors). Brightness of the three-dimensional display 12 may be increased by increasing the intensity of any of the optical pulses 32a-32c. Brightness of the three-dimensional display 12 may also be increased from the optical mixer by use of an intense "gating" pulse of frequency $F_4$ from a fourth pulsed optical source 16d and choosing $F_1+F_2+F_3+F_4$ as the desired wavelength.

Figure 5:
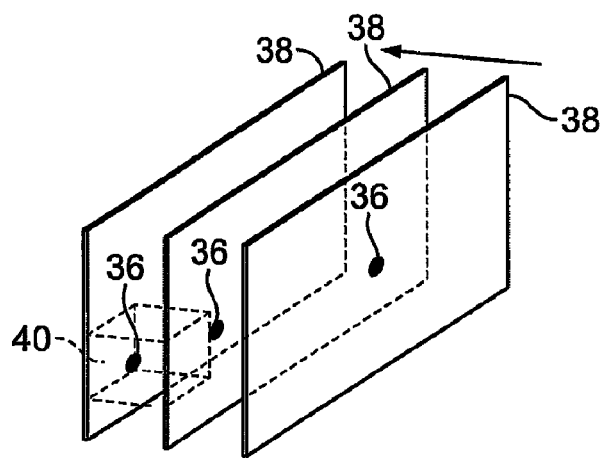
FIG. 5 is a schematic diagram of an optical mixer moving periodically back and forth along the z axis under the control of display electronics such that optical pulse wave fronts will intersect the optical mixer at different points of successive planes, which provides a mechanism to generate an optical mixer output of the desired optical wavelength (color) at any point in the volume of space that is traversed by the optical mixer.

Now referring to FIGS. 1 and 5, moving the optical mixer 18 periodically back and forth in a direction normal to the plane of the optical mixer under the control of the display electronics 24 that also controls the pulse timing of the optical pulses 16a-16k provides a mechanism to generate an optical mixer output of the desired optical wavelength (color) at any point in the display volume of space that is traversed by the optical mixer 18. Objects or their representations are displayed by creating the desired optical frequencies in the optical mixer 18 at points, such as P1, as the optical mixer 18 moves periodically back forth. The three-dimensional display 12 creates pulses of light in the optical mixer 18 at desired points, such as P1, that then travels thru the optical filter 22 to the viewer or viewing equipment 30. Each movement through the display volume 28 can show a different image to the viewer. As the optical mixer 18 moves back and forth at greater than or equal to about twenty traversals per second, persistence of vision creates the perception of motion.

Referring now to FIGS. 2 and 5, for a planar optical mixer, the wave fronts of the pulsed optical sources 32a-32k will converge and intersect the optical mixer 18 at different points 36 of successive planes 38 (see FIG. 5). Since the pulse repetition rate of the pulsed optical sources 16a-16k are very rapid relative to persistence of vision and the optical mixer 18 moves very slowly, optical mixer element 20a-20i can be sequentially excited in an interval during which the optical mixer 18 moves a very small distance. Also since three pulsed optical sources 16a-16c will converge at only one point in the display space and the proposed implementation of the optical display 12 allows for up to K pulsed optical sources 16a-16k, more than one optical mixer element 20a-20i in the optical mixer 18 may be excited in parallel.

Each of the optical mixer elements 20a-20i recursively passes through the display volume 28 such that during the recursion period, at least one of the optical mixer elements 20a-20i passes through each voxel 40. Thus, during each recursion period, a least one of the optical mixer element 20a-20i is capable of emitting a specific desired wavelength 26, in any selected voxel 40 observable by the viewer(s) 30 of the three-dimensional display 12 and thus a three-dimensional image is created. The three-dimensional display 12 is capable of producing a desired wavelength 26 at any voxel 40 in the display volume 28. For example, at some point in time when one of the optical mixer element 20a-20i arrives at a position in the display volume 28 where a particular desired wavelength 26 is desired, the display electronics 24 triggers pulses from several pulsed optical sources 16a-16k that arrive at the desired one of the optical mixer elements 20a-20i simultaneously. The pulsed optical sources positioning and timing meet the following conditions: (1) pulsed optical sources 16a-16k are sufficiently outside the display volume 28 to illuminate the desired one of the optical mixer elements 20a-20i; (2) the triggered pulsed optical sources 16a-16k are sufficiently separated so as to enable triangulation, by pulse timing, to excite a desired mixer element (e.g., 20a); and (3) the optical pulses 32a-32c are so short in duration that they overlap essentially at the desired one of the optical mixer elements 20a-20i. In summary, the display electronics 24 controls the pulsed optical sources 16a-16k to generate optical pulses 32a-32c that excite the desired optical mixer elements 20a-20i with a predetermined combination of optical frequencies that produce the desired wavelength 26 in the desired voxel 40.

Each of the pulsed optical sources 16a-16k operates at one or more predetermined optical frequencies. The optical display 12 may be constructed using one or more pulsed optical sources emitting short pulses in combination with one or more pulsed optical sources emitting longer pulses (up to infinite pulse widths, i.e., continuous illumination). Using optical pulses with very short pulse widths (called ultra short optical pulses with pulse widths in the femtosecond to nanosecond range) enables the excitation of specific voxels in the display volume 28 with such high accuracy that sharp images are produced. Exemplary methods and devices for generating and controlling ultra short optical pulses are disclosed in U.S. Pat. Nos. 6,603,778, 5,898,714, 5,852,700, and 5,177,752, the contents of which are incorporated herein by reference in their entirety. Further disclosure of methods and devices for generating and controlling ultra short optical pulses is discussed in the technical journal articles, John D. Simon, *Reviews of Scientific Instruments,* 60 (12), December 1989, G. Steinmeyer, *Science,* Vol. 286, Nov. 19, 1999, and Roberto Paiella, *Science* Vol. 290, Dec. 1, 2000, the contents of which are incorporated herein by reference in their entirety.

Figure 4:
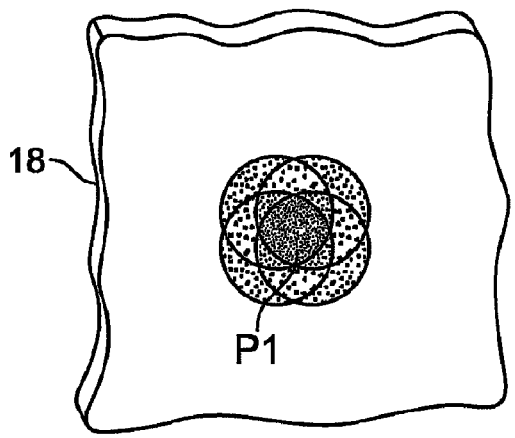
FIG. 4 is a schematic diagram showing that pulses from several optical sources arriving at point P1 at the same point in time that minimizes the spatial spread of the overlapping pulses.

The optical pulses 32a-32k emanating from the pulsed optical sources 16a-16k with appropriate timing arrive at the desired point, P1, in the display volume 28 together with the optical mixer 18. Furthermore, the pulsed optical sources 16a-16k are sufficiently separated from each other such that pulses from the sources arriving at point P1 minimize the spatial spread of these overlapping pulses (see FIG. 4). The three-dimensional display 12 is operable with as many pulsed optical sources as is necessary to excite the optical mixer 18 within the cone of acceptance for each voxel in the display volume 28.

The particular subset of the optical mixer elements 20a-20i that are illuminated is determined by the display electronics 24, which selects which of the K pulsed optical sources 16a-16k are used, and which selects pulsed optical source parameters such as optical pulse timing, optical pulse width (including continuous illumination) and intensity. The K pulsed optical sources 16a-16k produce pulsed or non-pulsed desired wavelengths 26 under the control of the display electronics 24 and may also include one or more optical elements (not shown) to direct the light from the pulsed optical sources 16a-16k to a subset of the optical mixer elements 20a-20i. When used, the optical elements shape the output from the pulsed optical sources 16a-16k into a cone of light or into light that is essentially parallel to the illuminated subset of the optical mixer elements 20a-20i.

Figure 6:
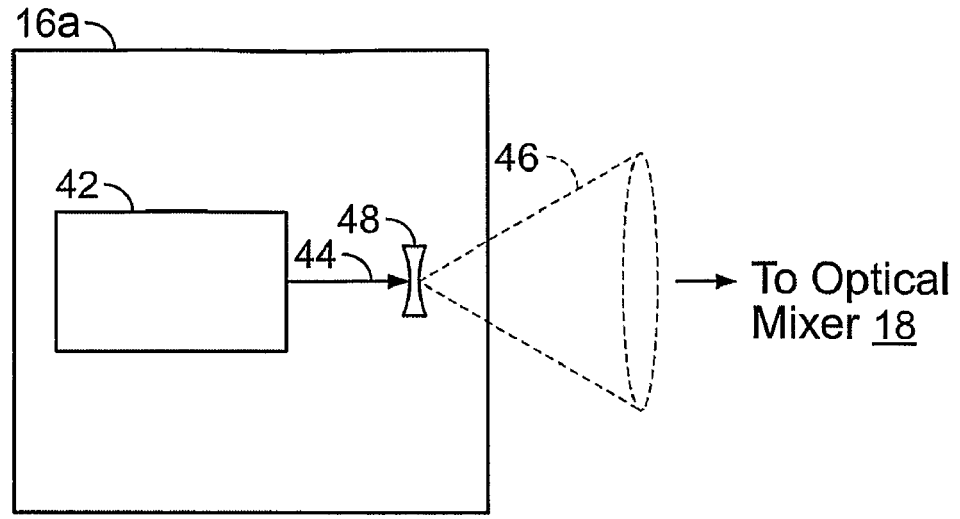
FIG. 6 is a schematic diagram of an implementation of a pulsed optical source in which a laser produces a beam of light which is transformed into a cone of light by a concave lens.
Figure 7:
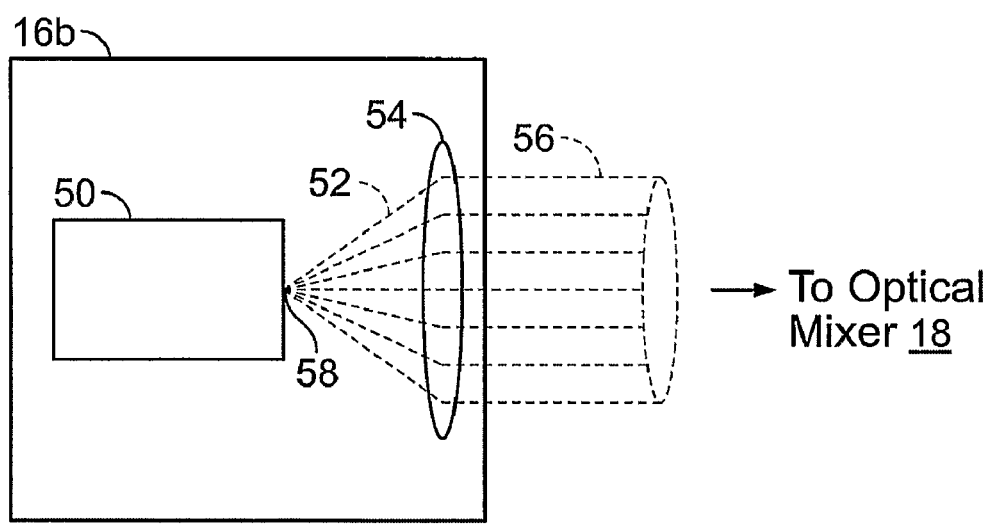
FIG. 7 is a schematic diagram of another implementation of a pulsed optical source in which a point source of light emits light which is transformed by a convex lens into extended beams with plane wave fronts.

Referring now to FIG. 6, an implementation of a pulsed optical source (e.g. 16a) is depicted. A desired wavelength generator 42 (e.g., a laser) produces a beam of light 44 which is transformed into a cone of light 46 by an optical element (e.g., a concave lens 48). Referring now to FIG. 7, another implementation of a pulsed optical source (e.g. 16b) is depicted. A desired wavelength generator 50 (e.g., a point source of light) emits light 52, which is transformed by optical elements, (e.g., a convex lens 54) into extended beams 56 with plane wave fronts which illuminate a subset of the optical mixer elements 20a-20i. Plane wave fronts of light are created when the desired wavelength generator 50 is located at the focal point 58 of the convex lens 54 or at the focal point of a mirror (not shown). Using parallel beams of light allows for a more simplified arrangement of the pulsed optical sources 16a-16k and ensures the illumination of each of the optical mixer elements 20a-20i are within their acceptance cone for every voxel in the display volume 28. More particularly, the incident angles of the optical pulses 32a-32k on the optical mixer 18 stay more constant as the mixer moves and may provide a more constant conversion efficiency during the movement of the optical mixer 18. The pulsed optical source 16b creates light with a constant orientation relative to the optical mixer 18 which produces a more constant angle of incidence as the optical mixer 18 traverses the display volume 28 as compared to the pulsed optical source 16a which, because it produces a cone of light, has an angle of incidence relative to the optical mixer 18 that changes as the optical mixer 18 traverses the display volume 28.

Figure 8:
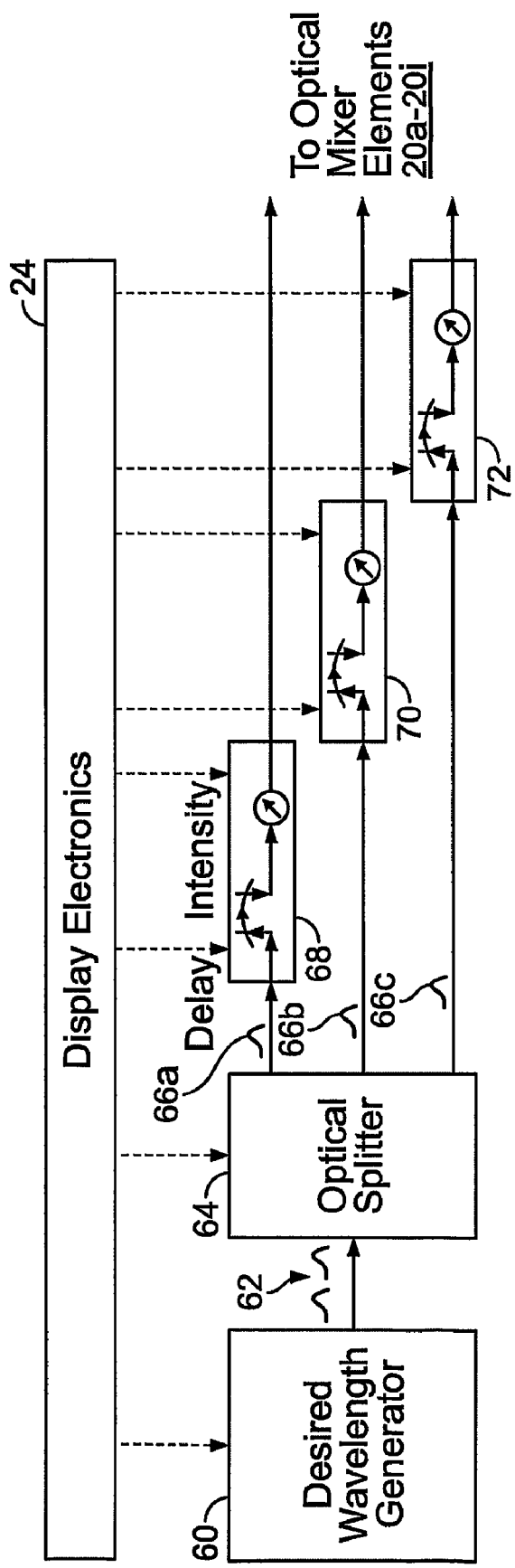
FIG. 8 is a schematic diagram showing how a desired wavelength generator can be shared across three pulsed optical sources.

In FIGS. 6 and 7 each individual pulsed optical source 16a, 16b contains its own desired wavelength generator 42, 50, respectively. The wavelength generator 42, 50 can be shared across multiple optical sources. Referring now to FIG. 8, a desired wavelength generator 60 can be shared across three optical sources (e.g. 16a-16c). The desired wavelength generator 60 produces a train of pulses 62 under the control of the display electronics 24. The train of pulses 62 passes through an optical splitter 64 which divides the train of pulses 62 into three trains of pulses 66a-66c. Three optical pulse controllers 68, 70, 72 delay and attenuate a respective train of pulses 66a-66c for optically exciting the optical mixer elements 20a-20i.

The train of pulses 62 from the desired wavelength generator 60 may be eliminated completely by the display electronics 24 by having the optical pulse controllers 68, 70, 72 increase the attenuation of the train of pulses 62. This attenuation of the train of pulses 62 can be implemented in one device within each of the beam paths of the desire wavelength generator 60 using a spatial light modulator (SLM—not shown).

Figure 9:
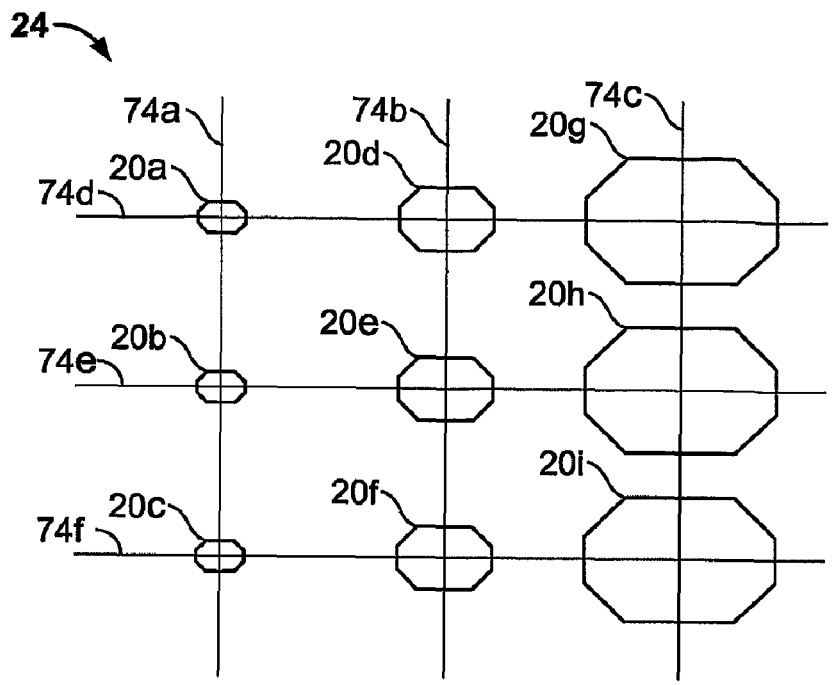
FIG. 9 is a schematic diagram depicting an optical mixer constructed from a plurality of smaller optical mixing elements.

The optical mixer 18 of FIG. 2 can contain as few as a single optical mixer element, i.e. the optical mixer 18 can be constructed as a single contiguous planar sheet of a material. Referring now to FIGS. 2 and 9, the optical mixer 18 can also be constructed from a plurality of smaller optical mixing elements 20a-20i across the surface defined by the shape (e.g., planar) of the optical mixer 18. In the preferred embodiment, the optical mixing elements 20a-20i are placed at the intersection of the curves 74a-74f which delineate the regular arrangement of the optical mixer 18. While FIG. 9 shows the curves 74a-74f as straight lines for the simplicity of the drawing, in general they are of a shape which enhances the desired frequency conversion properties of the optical mixer 18. The optical mixing elements 20a-20i can be of different shapes, sizes, and composition.

The optical mixing elements 20a-20i provide non-linear optical mixing. When light of frequencies $\omega_1$, $\omega_2$, with wavelengths $\lambda_1$, $\lambda_2$, respectively, impinge upon an optical mixer element (e.g. 20a), a first order analysis shows that sum and difference frequencies are created. Non-linear mixing of these optical frequencies in the optical mixing element 20a; by a first order analysis, creates new optical frequencies $\omega_3$ and $\omega_4$.

The sum frequency created is $\omega_1 + \omega_2 = \omega_3$; $(1/\lambda_1 + 1/\lambda_2 = 1/\lambda_3)$ and the difference frequency is $\omega_1 - \omega_2 = \omega_4$; $(1/\lambda_1 - 1/\lambda_2 = 1/\lambda_4)$ When more than two frequencies impinge upon the optical mixer element 20a, a first order analysis shows that additional frequencies are created, including the sum and difference of each pair of impinging frequencies and the sum of all the frequencies. Desired wavelength(s) 26, which result from the non-linear mixing of the pulsed optical source frequencies, are selected by using one or more optical filters within the optical mixer element 20a to prevent all but the desired wavelength(s) 26 from reaching the viewer(s) 30 of the three-dimensional display 12.

The optical mixer element 20a also produces additional optical frequencies by higher order non-linear effects. For example, the optical mixer element 20a may produce a frequency component that is double the frequency of $\omega_1$. While the higher order non-linear frequencies generated have lower conversion efficiencies than the first order frequencies produced and hence the higher order non-linear frequencies are of lower intensity than first order frequencies, the higher order non-linear frequencies are undesirable. In the optical display 12, the frequencies of the pulsed optical sources 16a-16k are chosen such that for a given set of desired wavelength(s) 26 (e.g., the three primary colors for a RGB display), no second, third or higher order non-linear interaction up to order N will generate a new frequency that is also a desired wavelength. The optical mixer elements 20a-20i incorporate filters that pass only the desired wavelength(s) 26, then unintended higher order frequencies created in the optical mixer elements 20a-20i will not reach the viewer(s) 30.

The non-linear optical mixing elements 20a-20i include materials that permit the generation of optical sum and difference frequencies at the desired wavelength(s) 26. Typical materials include inorganic ferroelectric materials such as $LiNbO_3$, $LiIO_3$, $KH_2PO_4$, $Tl_3AsSe_3$ (TAS), $Hg_2Cl_2$, $KH_2PO_4$ (KDP), $KD_2PO_4$ (DKDP or D*KDP), $NH_4H_2PO_4$ (ADP), $Hg_2Br_2$ and $BaTiO_3$; quantum well structure semiconductors that include GaAs, etc.; organic single crystals such as 4-nitrobenzylidene-3-acetamino-4-methoxyaniline (MNBA) and 2-methyl-4-nitroaniline (MNA); conjugated organic high molecular compounds such as polydiacetylene and polyarylene vinylene; and semiconductor grain-dispersed glass comprising CdS, CdSSe, etc. dispersed in glass.

Figure 10:
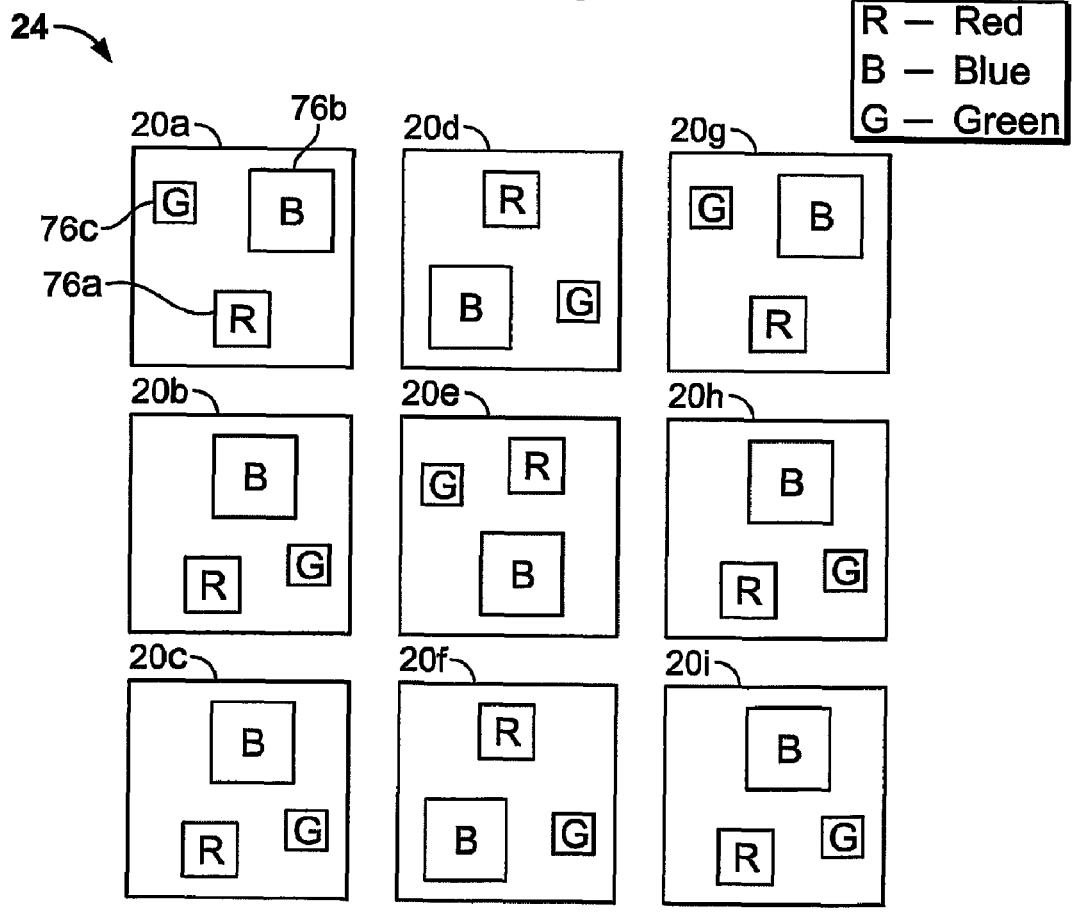
FIG. 10 is a schematic diagram showing that each of the smaller optical mixing elements of FIG. 9 can also include optical mixer sub-elements which are optimized for one of the three primary colors in an RGB display.

FIG. 2 depicts each of the optical mixing elements 20a-20i as being made from a single non-linear optical material that can generate all possible frequencies in the visible spectrum. Referring now to FIG. 10, each of the optical mixing elements 20a-20i in an RGB optical mixer can also include optical mixer sub-elements 76a-76c which are composed of non-linear optical materials optimized for one of three desired wavelengths—red, green, or blue. The sub-elements 76a-76c are arranged and spaced such that no two types of sub-elements (optimized for the same desired wavelength) are adjacent. This arrangement and spacing of the sub-elements 76a-76c minimizes the unintended excitation of nearby sub-elements with the same desired wavelength (type). Small spacing is consistent with physically small implementations of the three-dimensional display 12 that are designed for high resolution. Larger spacing between the sub-elements 76a-76c is consistent with physically larger implementations of the three-dimensional display 12 (e.g., a movie screen size display).

Each of the sub-elements 76a-76c is composed of a non-linear optical material that generates a desired wavelength 26 when excited by the pulsed optical sources 16a-16k under the control of the display electronics 24. In an RGB display, the sub-element 76a that produces the red desired wavelength includes a filter (not shown) that blocks all wavelengths except the red desired wavelength. Similarly the blue and green sub-elements 766b, 766c, have blue and green filters, respectively.

The optical mixer sub-elements 76a-76c are capable of being simultaneously excited since there are K pulsed optical sources 16a-16k and each of the three sub-elements 76a-76c in one of the optical mixer elements 20a-20i may be excited by three of the K pulsed optical sources 16a-16k.

An optical mixer 18 composed of a plurality of optical mixer elements 20a-20i has several advantages over an optical mixer 18 composed of only one element. Arrays of small optical mixer elements 20a-20i are more cost efficient than an optical mixer 18 composed of a single optical mixer element for all except very small displays. For example, a Lithium Niobate crystal, $LiNbO_3$, when used as a non-linear optical mixer element, is currently very difficult to produce in sizes beyond tens of centimeters on a side and becomes more expensive as the size of the crystal increases. Discrete optical mixer elements 20a-20i can be designed with spacing between the elements and therefore the unintended excitement of an optical mixer element 20a-20i by optical excitement of an adjacent optical mixer element 20a-20i is reduced by this inter-element spacing. The conversion efficiency for the non-linear materials which make up the optical mixer elements 20a-20i varies by material type and other design parameters such as size, shape and orientation relative to the pulsed optical sources 16a-16k. The optical mixer sub-elements 76a-76c are independently optimized for each of the desired wavelengths 26 used in the three-dimensional display 12. For example, in an optical mixer 18 that use three desired wavelengths 26 to produce three primary colors in an RGB display, the optical mixer sub-element 76a can be optimized for the generation of red desired wavelengths; the optical mixer sub-element 76b can be optimized for the generation of blue desired wavelengths; and the optical mixer sub-element 76c can be optimized for the generation of green desired wavelengths. For each of the optical mixer sub-elements 76a-76c, the design parameters, such as type non linear material, cross sectional area, thickness, size, acceptance angle, spectral acceptance, walk-off angle, etc. can each be independently optimized for each desired wavelength 26 to achieve a desired conversion efficiency, cost, and to equalize the maximum intensity produced by each type of optical mixer sub-element. Optimizing the optical mixer sub-element design by choosing the design parameters for each desired wavelength permits an equalization of the peak intensity for each desired wavelength relative to the viewer 30 of the three-dimensional display 12.

The conversion efficiency of one or more optical mixer elements 20a-20i is a measure of the intensity of the desired wavelength 26 generated by an optical mixer element relative to the excitation of the element by the pulsed optical sources 16a-16k. Improving the conversion efficiency increases the intensity of the desired wavelength(s) 26 transmitted to the viewer(s) 30 of the three-dimensional display 12, i.e., the conversion efficiency increases with non-linear mixer length. Conversion efficiency increases with area of the non-linear mixer on which the optical pulses 32a-32k of the pulsed optical sources 16a-16k impinge. The conversion efficiency increases with increasing excitation level up to a fixed limit (damage threshold) at which power conversion efficiency decreases. The conversion efficiency increases with phase matching (to be discussed below). When an optical mixer element includes a lens to focus the light onto the non-linear mixing material, the local intensity of the light increases, thereby generating a higher electric field, and thereby increasing the conversion efficiency.

The peak intensity of the output of a given optical mixer element (e.g. 20a) for a given fixed pulse width(s) of the optical pulses 32a-32k emanating from the pulsed optical sources 16a-16k and exciting the discrete elements 20a-20i is varied by adjusting the power output level of one or more of the pulsed optical sources 16a-16k which excite the element (e.g., 20a). The average power output level is reduced when the pulse width of one or more of the pulsed optical sources 16a-16k which is exciting the element 20a is shortened. Very high pulse rates are possible when the pulse widths are very short. Therefore, as the optical mixer 18 moves recurrently through the display volume 28 at repetition rates ranging from tens to perhaps thousand of times a second, the pulse rate of the pulsed optical sources 16a-16k can range form megabit to multi gigabit rates, thus illustrating that the optical mixer elements 20a-20i can be excited many times by the pulsed optical sources 16a-16k in the time that an optical mixer elements, e.g. 20a, takes to move through a voxel.

In an implementation where the optical mixer 18 is employed to output three different colors (e.g. the three primary colors), then the optical mixer 18 may use three different types of optical mixing elements 20a-20i to produce the output frequencies $F_1$, $F_2$ and $F_3$. The design parameters of the optical mixing elements 20a-20i will differ in order to achieve higher conversion efficiencies or more cost effective conversion efficiencies at the output frequencies $F_1$, $F_2$ and $F_3$. To equalize the peak output intensity at the output frequencies $F_1$, $F_2$ and $F_3$, from element types with lower conversion efficiencies, physical design parameters are appropriately chosen, such as the cross sectional area upon which the optical pulses 32a-32k impinge, or the thickness of the optical mixing elements 20a-20i. Other design parameters to achieve equalization include phase-matching type and angle, damage threshold, acceptance angle, spectral acceptance, crystal size, walk-off angle, group velocity mismatching, and temperature acceptance.

Figure 11:
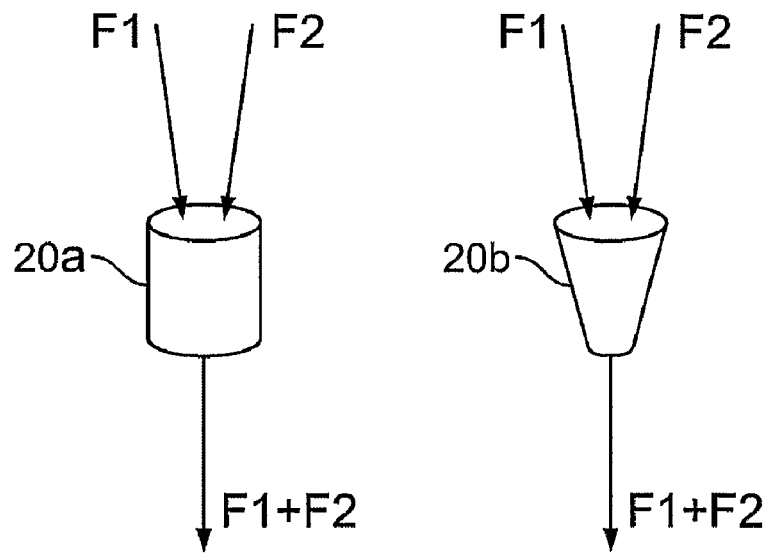
FIG. 11 is a perspective view of optical mixing elements made from a monolithic non-linear optical material depicted as having a cylindrical shape and another optical mixing element depicted as having a truncated conical shape.

Referring now to FIG. 11, an optical mixing element, e.g. 20a, is depicted as having a cylindrical shape, while another optical mixing element, e.g. 20b, is depicted as having a truncated conical shape. The shape or size of the optical mixing elements 20a-20i in the optical mixer 18 are chosen to compensate for conversion efficiency variations by frequency or position of the optical mixer 18 in the display volume 28, power output variations of pulse sources by frequency, or other attenuation and losses in the system. Two optical frequencies (colors) $F_1$ and $F_2$ impinge upon the cylindrical optical mixing element 20a and one of the frequencies produced in the cylindrical optical mixing element 20a is the sum of these frequencies $F_1+F_2$. Conversion efficiency improves as the diameter of the cylindrical optical mixing element 20a is increased because a greater amount of light enters the cylindrical optical mixing element 20a. Conversion efficiency also improves as the length of the cylinder increases. Similarly, one end of an optical mixing element, e.g. 20c, may be coated with a reflective substance to give it a mirrored surface so that the input optical pulses 32c and the resulting nonlinear output pulses 34 of different frequencies exit from the same end of the optical mixing element 20c that the input optical pulses 32c entered. Traveling through the optical mixing element 20c twice further increases the conversion efficiency.

The orientation of the optical mixer elements 20a-20i relative to the optical excitation by the pulsed optical sources 16a-16k is a critical parameter relative to the intensity of the desired wavelengths 26 generated in the optical mixer element and transmitted to the viewer(s) 30 of the three-dimensional display 12. As discussed above, the conversion efficiency of the optical mixer elements 20a-20i of the optical mixer 18 among other properties is dependent upon phase mismatching and hence on the alignment of the incident optical energy relative to the structure of the optical mixer 18. Phase-matching can be implemented by angle tilting, temperature tuning, or other methods. Angle tilting is used the most to obtain phase-matching.

The orientation of each of the optical mixer elements 20a-20i relative to each of the excitation pulsed optical sources 16a-16k is further complicated as the optical mixer 18 is recurrently moving through the display volume 28 and therefore the angle of excitation of an optical mixer element 20a-20i from a particular combination of pulsed optical source 16a-16k changes significantly and therefore the conversion efficiency changes accordingly. The three-dimensional display 12 uses alternative pulsed optical sources 16a-16k to maintain optimal conversion efficiency by utilizing the display electronics 24 to select the optimally positioned pulsed optical sources 16a-16k for each of the optical mixer elements 20a-20i and for each set of positions of the optical mixer 18 as it moves recurrently in the display volume 28. Thus the logic employed by the display electronics 24 continually changes the combination of pulsed optical sources 16a-16k that are exciting each of the optical display elements 20a-20i to produce the desired wavelength(s) 26 in each voxel, at P1 in FIG. 1.

Figure 12A:
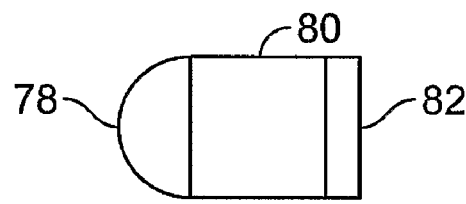
FIG. 12A is a side view of an optical mixing element that is a combination of a hemispherical lens, a cylindrical non-linear mixing material, and a cylindrical desired wavelength filter.
Figure 12B:
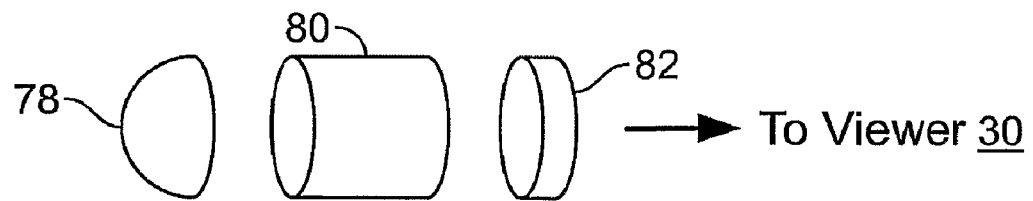
FIG. 12B is an exploded perspective view of the optical mixing element of FIG. 12A.
Figure 13A:
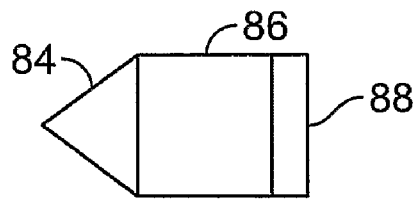
FIG. 13A is a side view of an optical mixing element that is a combination of a triangular lens, a triangular non-linear mixing material, and a triangular desired wavelength filter.
Figure 13B:
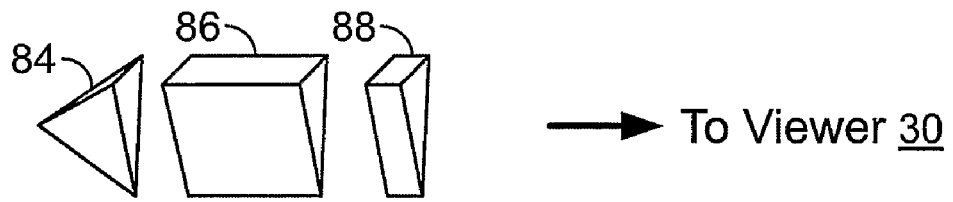
FIG. 13B is an exploded perspective view of the optical mixing element of FIG. 13A.
Figure 14A:
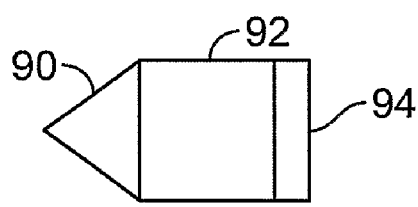
FIG. 14A is a side view of an optical mixing element that is a combination of a pyramidal lens, a rectangular non-linear mixing material, and a rectangular diffuser.
Figure 14B:
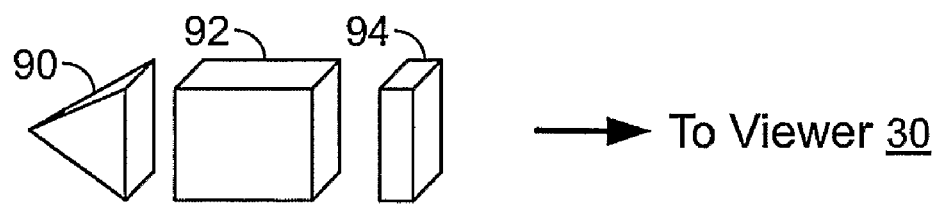
FIG. 14B is an exploded perspective view of the optical mixing element of FIG. 14A.
Figure 15A:
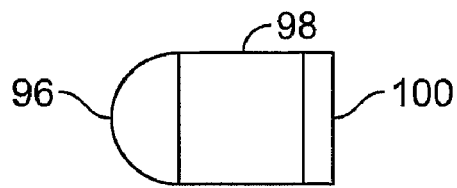
FIG. 15A is a side view of an optical mixing element that is a combination of a hemispherical lens, a rectangular non-linear mixing material, and a rectangular desired wavelength filter.
Figure 15B:
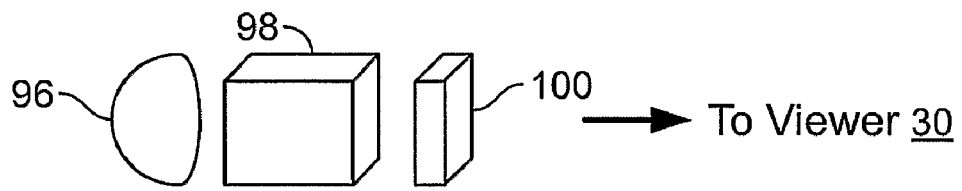
FIG. 15B is a an exploded perspective view of the optical mixing element of FIG. 15A.

The optical mixer elements of FIGS. 9-11 depict the optical mixer elements 20a-20i as being constructed from non-linear mixing materials. Referring now to FIGS. 12A-15B, the optical mixer elements 20a-20i can include additional elements to enhance the production and transmission of the desired wavelengths 26. FIGS. 12A, 12B show a hemispherical lens 78 used in combination with a cylindrical non-linear mixing material 80 and a cylindrical desired wavelength filter 82. FIGS. 13A, 13B show a triangular lens 84 used in combination with a triangular non-linear mixing material 86 and a triangular desired wavelength filter 88. The triangular lens 84 need not be symmetric. FIGS. 14A, 14B shows a pyramidal lens 90 used in combination with a rectangular non-linear mixing material 92 and a rectangular diffuser 94. FIGS. 15A, 15B, which depict the preferred embodiment, shows a hemispherical lens 96 used in combination with a rectangular non-linear mixing material 98 and a rectangular desired wavelength filter 100. The optical display 12 is not limited using those shapes or combinations of shapes of lenses, non-linear mixing materials, desired wavelength filters/optical diffusers depicted in FIGS. 12A-15B. In any of the embodiments of FIGS. 12A-15B, optical diffusers can be used in place of or in addition to the desired wavelength filters and vice versa.

The lenses (e.g., the lens 78) adjust the angle of incidence of light from the pulsed optical sources 16a-16k relative to the optical axes of the non-linear mixing materials (e.g. the material 80). The addition of the lenses focuses light onto the non-linear mixing materials (e.g., the material 80), which increases the local intensity of the optical excitation of the non-linear mixing materials (e.g., the material 80), and which increases the electric field within the non-linear mixing materials (e.g., the material 80), results in higher conversion efficiency. The desired wavelength filters (e.g., the filter 82) insure that for all the pulsed optical source frequencies incident upon the non-linear mixing materials (e.g., the material 80) and for all the new wavelengths generated within the optical mixer (e.g., the material 80) by non-linear optical interaction, only the desired wavelength(s) 26 are passed to the viewer(s) 30. The non-linear optical interaction occurs in the non-linear mixing materials (e.g., the material 80) for light from the pulsed optical sources 16a-16k that impinges thereupon within the cone of acceptance range of angles. This range is dependent upon certain parameters of the non-linear mixing materials (e.g., the material 80), such as thickness and type of non-linear material. If the pulsed optical sources 16a-16k are positioned too far apart from each other, there will be position points for the optical rays from the pulsed optical sources 16a-16k that upon passing through the lenses (e.g., the lens 78) will be directed at such a large angle with respect to the peak conversion optic axis of the non-linear mixing materials (e.g., the material 80) that incident light from the pulsed optical sources 16a-16k is not converted. By using the lenses (e.g., the lens 78), spacing between pulsed optical sources is limited only by the aperture of the lenses (e.g., the lens 78), rather than being determined by the acceptance angle of the non-linear mixing materials (e.g., the material 80). The size of the lenses (e.g., the lens 78) can be made relatively large compared to the size of the non-linear mixing materials (e.g., the material 80). The optical diffusers (e.g. the diffuser 94) greatly reduce the directional intensity variations of the desired wavelength(s) 26 as they exit the optical mixer materials (e.g., the material 92).

The desired wavelength filters (e.g., the filter 80) may be omitted when the non-linear mixing materials (e.g., the material 80) are designed to selectively enhance specific design wavelength(s) 26 when excited by the pulsed optical sources 16a-16k. In some non linear materials, such as Lithium Niobate, the peak conversion efficiency varies by orientation as a function of the desired wavelength produced. The orientation of the excitation by the pulsed optical sources 16a-16k is chosen to correspond to the orientation within the non-linear mixing materials (e.g., the material 80) along which the conversion of the desired wavelength(s) 26 is maximized. Since each desired wavelength orientation has a different cone of acceptance in the non-linear mixing materials (e.g., the material 80), choosing the positions of pulsed optical sources 16a-16k so that the optical pulses 32a-32k emitted are incident upon the non-linear mixing materials (e.g., the material 80), within their cone of acceptance yields only the desired wavelength(s) 26. Under these conditions, the optical mixer elements 20a-20i need only contain one non-linear mixing material (e.g., the material 80) containing a single sub-element than a separate sub-element for each desired wavelength. However, each desired wavelength produced exits the non-linear mixing material (e.g., the material 80) at a different angle corresponding to the orientation along which the conversion of the desired wavelength 26 is maximized. Thus the direction of peak intensity of light exiting from the non-linear mixing material (e.g., the material 80) varies according to the desired wavelength 26. As depicted in FIGS. 14A, 14B, the use of an optical diffuser 94 in place of a desired wavelength filter greatly reduces the directional intensity variations of the desired wavelength 26 observed by the viewer 30. Dynamic equalization of the desired wavelengths 26 is implemented by adjusting the peak power and pulse width of the optical pulses 32a-32k and by choosing conversion efficiency via the selection of alternative pulsed optical sources 16a-16k.

Figure 16A:
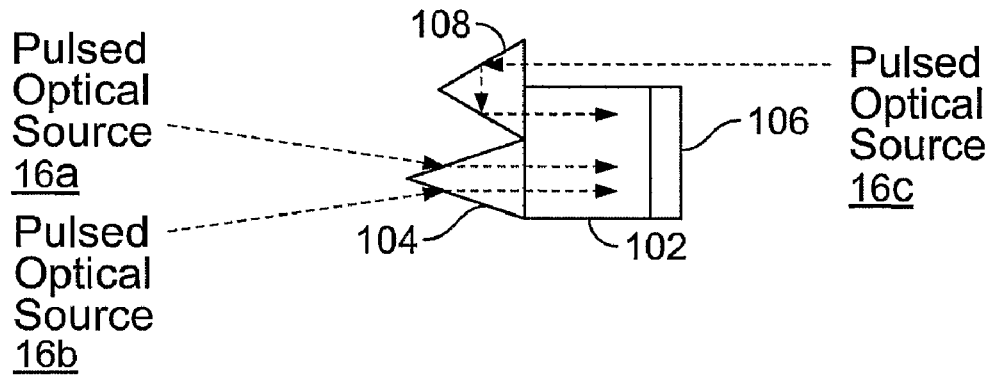
FIG. 16A is a side view of an optical mixing element that is a combination of a rectangular non-linear mixing material, a pyramidal lens, a rectangular desired wavelength filter, and a pyramidal optical reflector which allows one or more pulsed optical sources to be positioned on the same side of an optical mixer as a viewer.
Figure 16B:
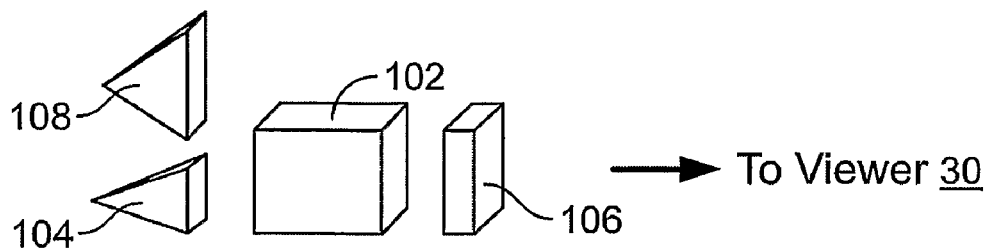
FIG. 16B is a an exploded perspective view of the optical mixing element of FIG. 16A.

Referring now to FIGS. 16A, 16B, another variation of the optical mixer elements 20a-20i of FIGS. 9-11 is depicted. The optical mixer elements 20a-20i of FIGS. 16A, 16B includes a rectangular non-linear mixing material 102, a pyramidal lens 104, a rectangular desired wavelength filter 106, and an optical reflector 108 which allows one or more of the pulsed optical sources 16a-16k to be positioned on the same side of the optical mixer 18 as the viewer 30. The pulsed optical sources 16a, 16b provide excitation of the rectangular non-linear mixing material 102 in the direction of the viewer 30. The pulsed optical source 16c is on the opposite side of the non-linear mixing material 102 and the direction of excitation from the pulsed optical source 16c is reversed to coincide with the direction of pulsed optical sources 16a, 16b.

Figure 17:
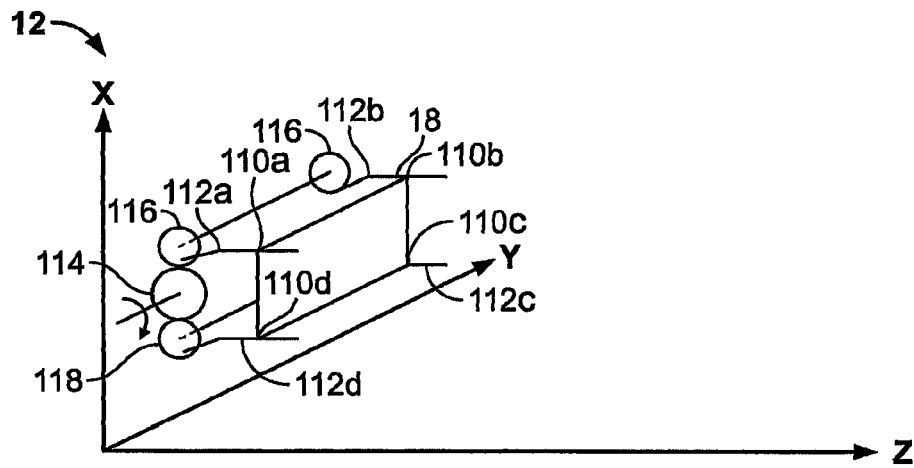
FIG. 17 is a schematic diagram of a mechanical mechanism for moving a planar optical mixer back and forth.

Referring now to FIG. 17, a simple mechanism for moving a planar optical mixer 18 back and forth is depicted. The corners 110a-110d of the optical mixer 18 are supported by tracks 112a-112d which maintain a constant orientation relative to the x-y plane. A rotational source 114, synchronized to the optical pulse generators 16a-16k turns an idler drive gear (not shown) which in turn is connected to top and bottom gear drives (not shown), respectively. As the top gear drive turns, linear motion is transferred to the top of the optical mixer 18 by a top gear arm 116. As the bottom gear drive turns, linear motion is transferred to the bottom of the optical mixer 18 by a bottom gear arm 118. The optical mixer 18 and its moving mechanism are operable over a range of atmospheric pressures. Preferably, the optical mixer 18 and its moving mechanism can be placed in a vacuum to minimize the air resistance when moving the optical mixer 18 at high speeds.

Figure 18:
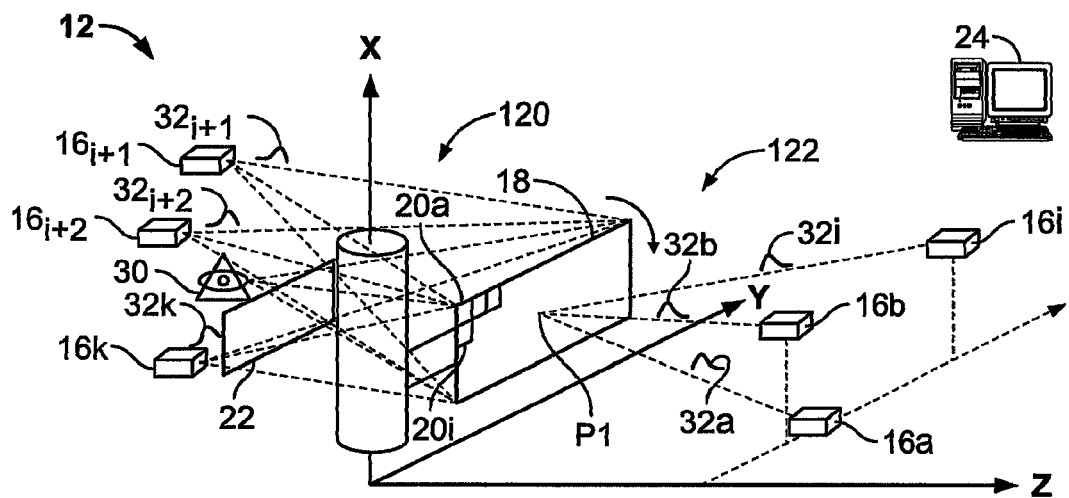
FIG. 18 is a schematic diagram showing that a optical mixer can be moved using a rotational motion about the X-axis.

The optical mixer 18 is depicted in FIG. 2 as moving back and forth in one dimension along the Z-axis. Referring now to FIG. 18, the optical mixer 18 is operated using a rotational motion about the X-axis. The pulsed optical sources 16a, 16b, . . . , 16i are positioned on one side 120 of the optical mixer 18 and the pulsed optical sources $16_{i+1}, 16_{i+2}, \ldots 16K$ are placed on the other side 122 of the optical mixer 18. Positioning some of the pulsed optical sources $16_{i+1}, 16_{i+2}, \ldots 16K$ on the same side of the optical mixer 18 as the viewer(s) 30 allows the use of very intense pulses that are directed away form the viewer(s) 30 and therefore return to the viewer(s) 30 at a much lower, and visually safer, intensity level after being reduced in intensity by the non linear conversion in the optical mixer 18. The display electronics 24 selects the combinations of pulsed optical sources 16a-16k that non-linearly combine in the optical mixer elements 20a-20i, e.g., the optical mixer element at point P1, which produce the desired wavelengths. The optical filter 22 blocks all wavelengths other than the desired wavelengths 26 produced in the optical mixer elements 20a-20i from reaching the viewer(s) 30 or viewing equipment.

Figure 19:
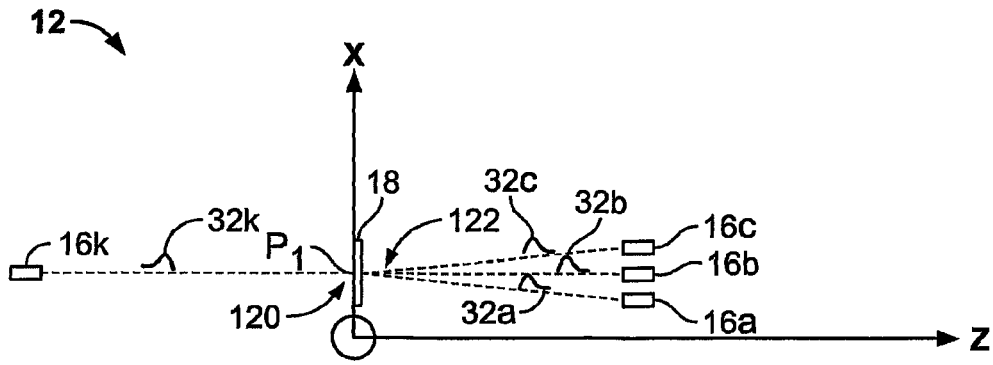
FIG. 19 is a schematic diagram of the optical mixer of FIG. 18 in which additional pulsed optical sources are placed on a side of the optical mixer opposite the side to which the original pulsed optical sources direct optical pulses, such that the pulsed optical sources arrive at the point P1 on the optical mixer at the same time.

Referring now to FIG. 19, if the pulsed optical source 16k is to be placed on the side 120 of the optical mixer 18 opposite the side 122 to which the other pulsed optical sources 16a-16c direct optical pulses, it is preferable that pulsed optical source 16k generates a pulse 32k that arrives at the plane of the optical mixer 18 at the same time as axis of the pulsed optical source 60k is aligned with the perpendicular to the optical mixer 18. It is also desirable to coat the side 122 of the optical mixer 18 with a partially transparent and partially reflective material, similar to a half silvered mirror, and/or to construct the optical mixer 18 of a thin material that will diffuse light. The side 120 of the optical mixer 18 may also include an optical filter to selectively transmit only the desired sum and difference products of the impinging optical pulses 32a-32k.

Figure 20:
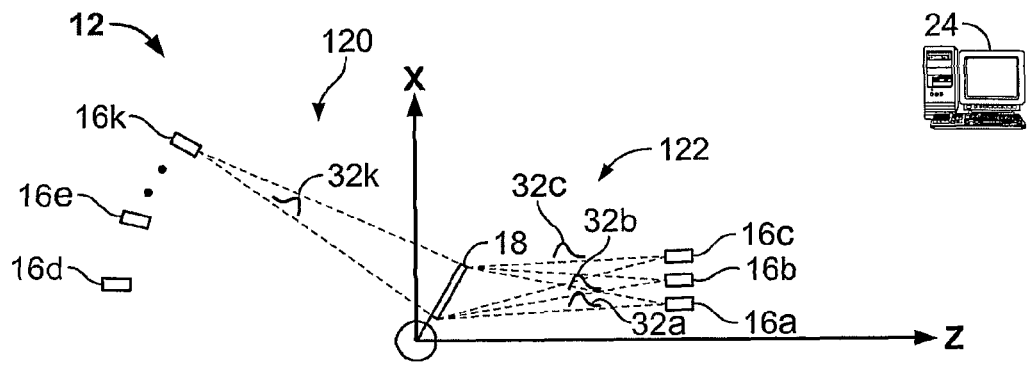
FIG. 20 is a schematic diagram depicting the pulsed optical sources of FIG. 19 in which the pulsed optical sources are successively utilized as the optical mixer rotates clockwise around the X-axis.

Referring now to FIG. 20, multiple pulsed optical sources 16a-16k are successively utilized as the optical mixer 18 rotates clockwise around the X-axis. This sequential use of pulsed optical sources 16a-16k maintains the alignment of the axes of the direction of the impinging optical pulses 32a-32k with the changing cone of acceptance of the optical mixer 18 and thus helps insure that the optical pulses 32a-32k impinge on the optical mixer 18 at an angle required for the necessary conversion efficiency. In a similar fashion, positioning the pulsed optical sources 16a-16k in space to maintain the alignment of their axes with the normal to the optical mixer 18 as the latter rotates (i) improves conversion efficiency, (2) simplifies the design of the display electronics 24 for generating overlapping optical pulses at desired points in the three-dimensional display space, and (3) reduces spatial dispersion of overlapping optical pulses at a desired point on the optical mixer 18 in the three dimensional display space.

Figure 21:
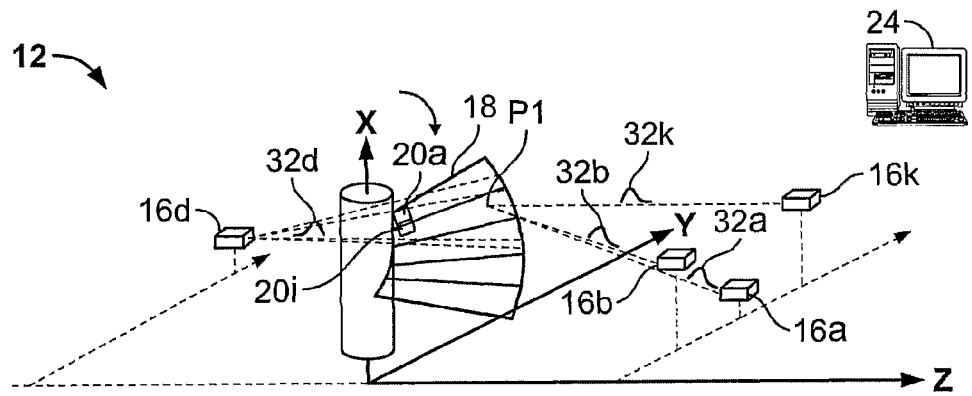
FIG. 21 is a schematic diagram showing that an optical mixer can have other physical shapes in addition to planar.

FIG. 21 shows an implementation of the optical mixer 18 that is not planar. In this implementation, the optical mixer 18 has a surface whose shape is known to the display electronics 24. The display electronics 24 selects changing combinations of pulsed optical sources 16a-16k that non-linearly combine in the optical mixer elements 20a-20i, to produce the desired wavelengths at desired voxels. The display electronics 24 stores the alternative possible combinations of the pulsed optical sources 16a-16k which are capable of producing the desired wavelength 26 in each voxel as lists of predetermined pulsed optical source combinations. The display electronics 24 also stores the predetermined lists of alternative possible combinations of pulsed optical sources 16a-16k which achieve different levels of conversion efficiencies. The logic of the display electronics 24 uses these predetermined lists to select appropriate combinations of the pulsed optical sources 16a-16k for each voxel in the three-dimensional image generated by the three-dimensional display 12.

Figure 22:
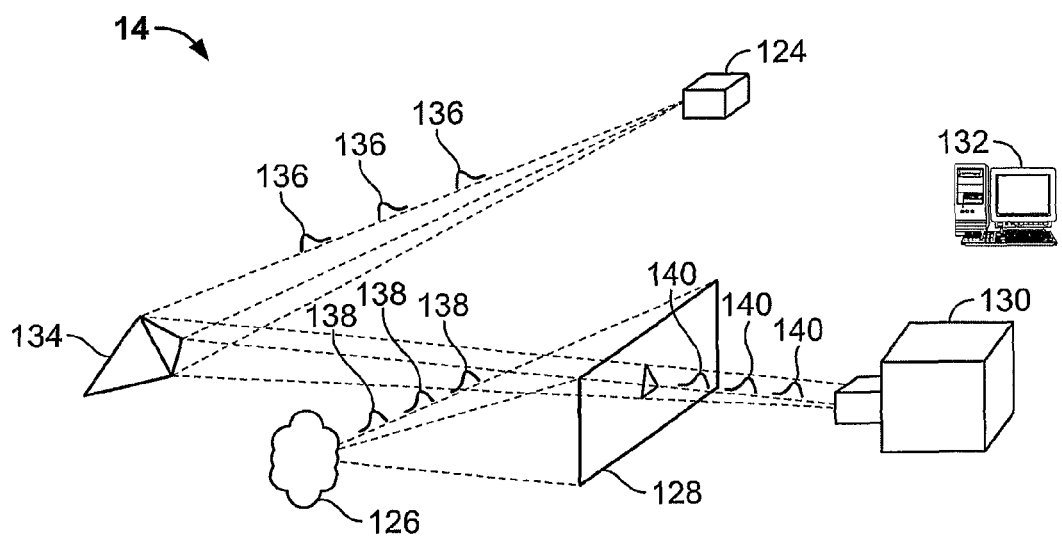
FIG. 22 is an exemplary embodiment of the three-dimensional image scanning device described in FIG. 1.

With reference to FIG. 22, an exemplary embodiment of the three-dimensional image scanning device 14 of the present invention is depicted. The three-dimensional image scanning device 14 is adapted to take three-dimensional frames of still or moving desired objects 134. The three-dimensional image scanning device 14 includes an pulsed optical source 124, a second source of optical pulses 126, an optical mixer 128, an optical recorder 130 (e.g. a two-dimensional camera), and image scanning device electronics 132 for controlling the coordination of the pulsed optical source 124, the second source of optical pulses 126, and the optical recorder 130. The pulsed optical source 124 illuminates the desired object 134 using optical pulses 136 of frequency $F_1$, which are of the same type as used in the three-dimensional display 12, and which can include ultra short optical pulses. The optical pulses 136 reflect from the desired object 134 and impinge on the optical mixer 128. The optical mixer 128 and pulsed optical source 124 can be constructed from the same materials and have the same geometry as those used in the optical display 12. The second source of optical pulses 126 can take on at least two forms to be described below with reference to FIGS. 23, 24. The output of the second source of optical pulses is optical pulses 138 (of the same type as the optical pulses 136) of frequency $F_2$, which impinge on the optical mixer 128. The optical pulses 138 have controlled time delays with respect to the optical pulses 136. The optical pulses 136, 138, arriving and temporally overlapping at the optical mixer 128, interact in a non-linear fashion when passing through the optical mixer 128 as previously described for the optical mixer 18 associated with the three-dimensional display 12. What emanates from the optical mixer 128 is a set of pulses 140 that include pulses of not only the original frequencies $F_1$ and $F_2$, but also pulses of the sum and difference frequencies of the optical pulses 136, 138. This set of pulses 140 are transmitted to the optical recorder 130, which can include, for example, a visible wavelength and/or infrared camera. The image scanning device electronics 132, which can include a processor, are incorporated within or external to the optical recorder 130 and construct a complete three-dimensional representation of the object to be discussed below with reference to FIG. 25 from a succession of sets of pulses 140 (after appropriate filtering to extract the desired pulses 140).

Figure 23:
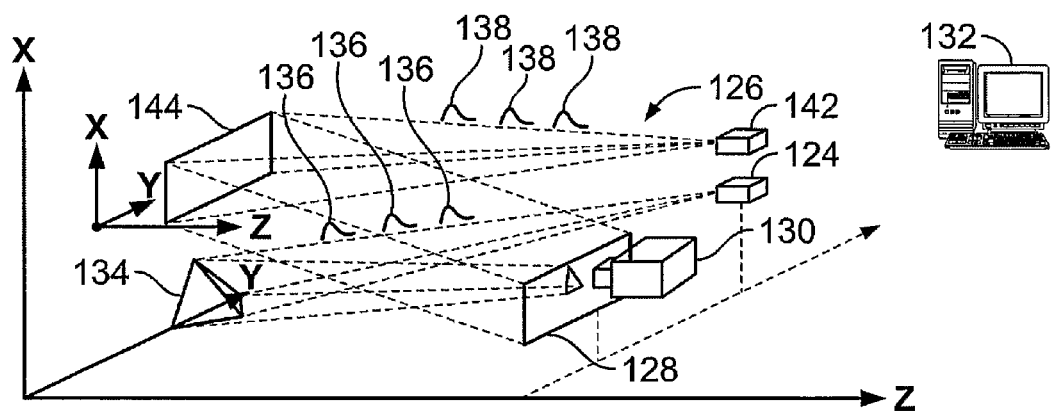
FIG. 23 is a schematic diagram of an arrangement for a second source of optical pulses which includes a pulsed optical source and a mirror.
Figure 24:
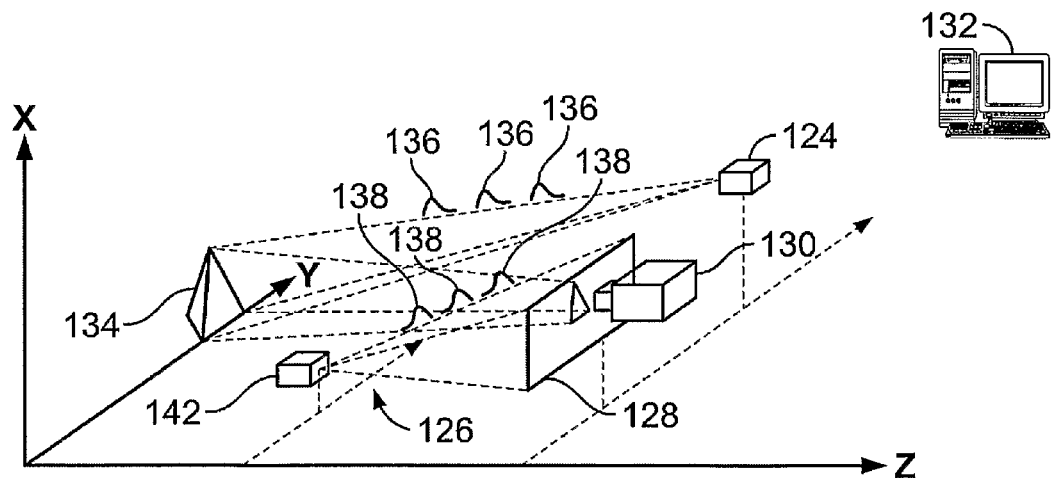
FIG. 24 is a schematic diagram of an arrangement for a second source of optical pulses in which the mirror of FIG. 23 is omitted and in which the timing of the optical sources is controlled by image scanner electronics.

Now referring to FIGS. 23 and 24, two preferred arrangements for the second source of optical pulses 126 are depicted. In FIG. 23, the second source of optical pulses 126 includes a pulsed optical source 142 and a mirror 144. The pulsed optical source 142 is of frequency $F_1$ and the pulsed optical source 124 is of frequency $F_2$. The pulsed optical source 142 transmits the optical pulses 138 of frequency $F_2$ toward a mirror 144 at approximately the same time that the pulsed optical source 124 illuminates the desired object 134 using optical pulses 136 of frequency $F_1$. The mirror 144 reflects the optical pulses 138 towards the optical mixer 128. The plane of the mirror 144 is approximately parallel to the plane of the optical mixer 128 (i.e., the x-y plane). The desired spatial/temporal time delay is implemented by moving the mirror 144 back and forth along the plane perpendicular to the plane of the mirror 144 and the optical mixer 128 (i.e., the z dimension). In the second arrangement of FIG. 24, the mirror 144 is omitted. The image scanning device electronics 132 are temporally linked to the pulsed optical sources 124, 142 in such a way that the optical pulses 138 are delayed a predetermined amount from the optical pulses 136.

Figure 25:
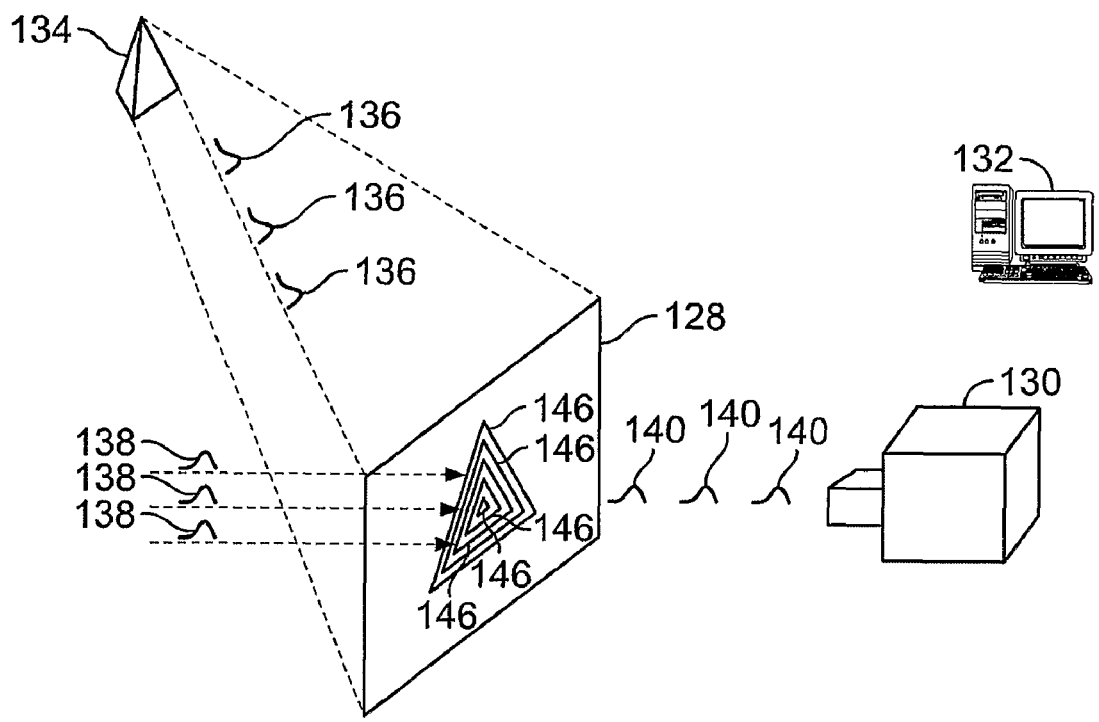
FIG. 25 is a schematic diagram showing that the generation and detection of reflected light from a desired object with high temporal resolution will reveal the depth profile of the desired object as a succession of different "slices" of the desired object are captured within the optics of an optical recorder.

Now referring to FIG. 25, each of the optical pulses 136 combine with a respective one of the optical pulses 138 at different times in the optical mixer 128. Since the optical pulses 136, 138 can be of very short duration, they interact with each other in the optical mixer 128 over a small area and over a short interval of time. Thus the successive pulses 140 emanating from the optical mixer 128 will have both high temporal and spatial resolution. Since spatial resolution is equivalent to temporal resolution, generating and detecting the reflected light with high temporal resolution will therefore reveal the depth profile of the desired object 134 with high spatial resolution.

Each of the optical pulses 138 are delayed by a tight succession of increasing time intervals relative to the optical pulses 136, which are captured as a succession of different "slices" 146 of the desired object 134 within the optics of the optical recorder 130. With one delay, the front edge of the desired object 134 is captured, followed by images moving toward the rear of the desired object 134. By varying the time delay between the two sets of optical pulses 136, 138 reflections with selected ranges (i.e., distance from the pulsed optical source 142) are gated into the optical recorder 130. The individual time delays of the optical pulses 138 do not have to be in ascending or descending order, but can be in any order so long as the image scanning device electronics 132 associated with the optical recorder 130 "combines" each of the resulting "slices" 146 of the desired object 134 to produce a composite three-dimensional image from a single perspective of the desired object 134.

A three-dimensional image of the desired object 134 is obtained by generating ranges for a succession of two-dimensional images that encompass all external views of the three-dimension desired object 134. This is accomplished by either rotating the desired object 134, or moving the optical recorder 130, the optical mixer 128, and optionally the pulsed optical source 124 and the second source of optical pulses 126 around the desired object 134. Alternatively, several sets of the optical recorder 130, the optical mixer 128, the pulsed optical source 124, and the second source of optical pulses 126 can be stationed around the desired object 134 and coordinated by the image scanning device electronics 132 to capture a complete three-dimensional representation of the desired object 134 and provide data to construct a three-dimensional model of the desired object 134.

The optical frequencies of the pulsed optical source 124 and the second source of optical pulses 126 can be chosen such that only the desired sum and/or difference frequencies generated in the optical mixer 128 are within the range that are processed by the optical recorder 130. For example, the frequencies $F_1$ and $F_2$ can be chosen to be optical frequencies below the frequency processed by the optical recorder 130 while the sum of these frequencies is within the processing range of the optical recorder 130 (i.e., optical up/down conversion).

Figure 26:
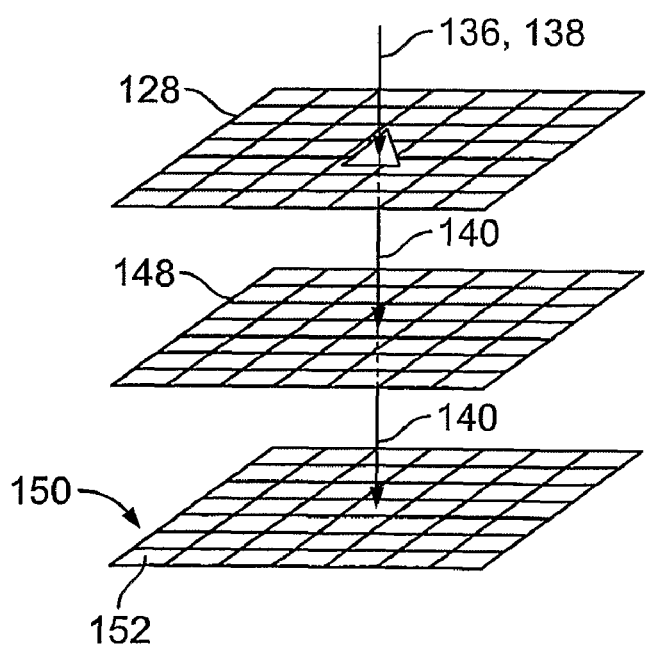
FIG. 26 is a schematic diagram depicting the process of separating spatial information from color information.
Figure 27:
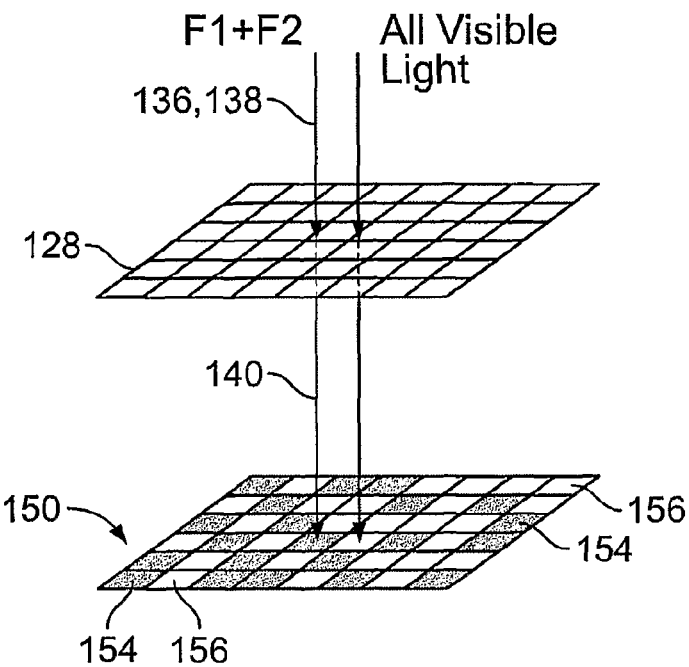
FIG. 27 is a schematic diagram showing a CCD array in which some of the pixels can be coated with a filtering material that passes only the spatial wavelengths relating to shape while other pixels pass only the desired wavelengths related to color.

Acquiring a three-dimensional shape and also acquiring the color of this shape makes use of a novel arrangement of the optical to electronic device, e.g., a charge coupled device (CCD) of a video camera, such that the color is captured at desired wavelengths. Referring now to FIGS. 26-27, the process of separating the spatial information at the spatial wavelengths from the color information encoded within the set of pulses 34 emanating from the optical mixer 128 is accomplished by optical filtering. In FIG. 26, filter(s) 148 is interposed between the optical mixer 128 and the CCD array 150 having pixels 152 within the optical recorder 130. Alternatively, in FIG. 27, some of the pixels 154 can be coated with an filtering material that only pass the spatial wavelengths relating to shape while the other pixels 156 can be coated with an filtering material that only pass the desired wavelengths related to color. The pixels 154 capture only the spatial information, while the uncoated pixels 156 capture the color and textual information. The pixels 154 capture only the spatial information, while the pixels 156 capture the color information. Another alternative is for the optical recorder 130 to selectively split the acquired color and spatial image using wavelength selective filters into spatial wavelengths and desired wavelengths and acquire these wavelengths with two separate CCD arrays, one for capturing spatial information and another for capturing color information.

Compared to other depth information systems, the three-dimensional image scanning device 14 can have enhanced precision, since the time resolution is given strictly by the length of the optical pulses 136, 138 and the optical nonlinear process within the optical mixer 128. The depth sensitivity and range can easily be adjusted to needed specifications by the selection of optical pulse length and the precision of the control in the time delay of the optical pulses 138. Additionally, depth information can be obtained even from very low reflecting desired objects 134, since in the non-linear mixing process the signal strength can be enhanced by use of an intense gating pulse (138).

The calibration of the three-dimensional image scanning device 14, especially embodiments using multiple optical recorders 130, is a very time consuming, expensive process when using conventional calibration techniques. With reference to FIGS. 28-33, a first exemplary embodiment of three-dimensional calibration equipment 16 is depicted. The three-dimensional calibration equipment 16 includes a light source 158 and a holographic calibration plate 160 that contains holographic encoded calibration information. Two or more optical recorders 162a-162c are placed on either side of the holographic calibration plate 160 through which a desired object 164 is viewed and one or more virtual calibration pattern(s) 166 is viewed in the vicinity of the desired object 164. Alternatively, a single optical recorder 162a is moved to different positions in space to acquire images of the desired object 164 from different perspectives. The optical recorders 162a-162c can be, for example, two-dimensional or three-dimensional analog or digital cameras.

For the purposes of the discussion below, "virtual calibration pattern" refers a holographic projection viewed in the vicinity, including overlaying or encompassing, of the desired object 164, "desired wavelengths" refers to the wavelengths of light reflected from the desired object 164 due to ambient illumination, and "calibration wavelengths" refers to the wavelengths of light produced by the holographic calibration plate 160 for viewing the virtual calibration pattern.

Reflected light from the desired object 164 passes through the holographic calibration plate 160 which is transparent to light of the desired wavelengths 168 (e.g., normal visible light reflected from the desired object 164). The desired wavelengths 168 pass through the holographic calibration plate 160 to the optical recorders 162a-162c. The light source 158, which may be on either side of the holographic calibration plate 160, illuminates the holographic calibration plate 160 with light of one or more calibration wavelengths 170. The light source 158 may produce pulses of coherent light, a beam of coherent light, or may produce incoherent light. Light of the calibration wavelengths 170 excites holographic calibration plate 160 in such a way that the optical recorders 162a-162c "see" a virtual calibration pattern 166 which is made recordable and storable by optical sensors within the optical recorders 162a-162c. The three-dimensional calibration equipment 16 is envisioned to use fixed holographic images or variable plate holograms (e.g. using external inputs to phase modulate the holographic calibration plate 160). The virtual calibration pattern 166 can be, for example, a "tinker toy" like grid or multidimensional wireframe of arbitrary shape (see FIG. 29) located in the vicinity of, overlapping, or enclosing the desired object 164. The virtual calibration pattern 166 can have any desired shape, such as the shape of a cube, portions of concentric cylinders, portions of concentric spheres, etc., depending on the geometry of the desired object 164 and the field of view of the optical recorders 162a-162c. Individual intersections of the grid of the virtual calibration pattern 166 can be labeled with numerals (see FIG. 30) and/or bar codes (see FIG. 31) to aid in the calibration process. Through movement of holographic calibration plate 160 or by changing of the illumination parameters (e.g. the frequency of the calibration wavelength 170 emitted by the light source 158), alternative calibration information can be generated for processing by the optical recorders 162a-162c. Changing the virtual calibration pattern 166 is accomplished by recording multiple, superimposed holograms at different calibration wavelength(s) 170 or different positions on the holographic calibration plate 160 and then choosing a specific calibration pattern by illuminating the holographic calibration plate 160 by the specific calibration wavelength(s) 170 corresponding to the specific virtual calibration pattern 166 or viewing from a specific position. Different calibration wavelengths 170 can produce, for example different grids 172, 174, 176 for the virtual calibration pattern 166 of varying density around the desired object 164 (see FIGS. 32 and 33) in order to capture, say, a small or larger portion of the desired object 164 (such as, for example, the nose, then the face, then the body of a human subject) depending on the desired scaling factors. These various grids or virtual calibration patterns 172, 174, 176 allow for calibration at selectable and assignable positions in the desired object three-dimensional target space.

Referring now to FIG. 34, a second exemplary embodiment of the three-dimensional calibration equipment 177 is depicted. The three-dimensional calibration equipment 177 includes a mirror 178, optical recorders 180a-180c, a light source 182, and a holographic calibration plate 184. In this embodiment, a mirror 178 is placed in the field of view of the optical recorders 180a-180c. The light source 182 illuminates the holographic calibration plate 184 at a position out of the field of view of the optical recorders 180a-180c. Light of calibration wavelength(s) 186 excites the holographic calibration plate 184 such that the virtual calibration pattern 188 is reflected in the mirror 178 and viewed by the optical recorders 180a-180c as if the virtual calibration pattern 190 were superimposed on or near the desired object 188. The mirror 178 is reflective at the calibration wavelengths 186 and transparent at the desired wavelengths 192. Thus images from the desired object 188 pass directly to the optical recorders 180a-180c. This embodiment enables the use of wavelengths in light source 182 that included the desired wavelengths 192, as the desired wavelengths 192 reflected from the desired object 188 will pass directly through the mirror 178 and are not reflected to the optical recorders 180a-180c.

The virtual calibration pattern 190 can be produced by calibration wavelength(s) 186 in the desired wavelength region of the electromagnetic spectrum for applications in which the calibration wavelength(s) 186 overlays the desired wavelengths 192. When the calibration wavelength(s) 186 overlays the desired wavelengths 192, both the desired object 188 and the virtual calibration pattern 190 are simultaneously observable by the optical recorders 180a-180c without additional post processing. For applications in which the desired wavelengths 192 alone are desired, the calibration wavelengths information is stored or processed separately from the desired wavelength information. Calibration wavelength information and desired wavelength information at overlapping wavelengths can also be temporally separated by enabling the calibration wavelength(s) 186 for short times and synchronizing observation of the calibration wavelength(s) 186. In the case where the calibration wavelength(s) 186 are different from the desired wavelengths 192, the images reaching the optical recorders 180a-180c of FIG. 34 contain both the desired wavelengths 192 and the calibration wavelength(s) 186.

Figure 28:
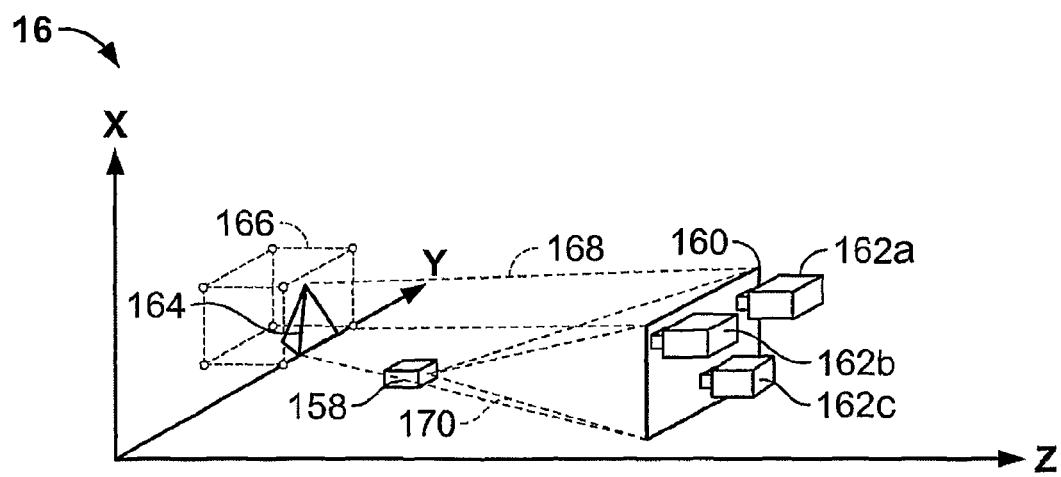
FIG. 28 is a schematic diagram of a first exemplary embodiment of the three-dimensional calibration equipment depicted in FIG. 1, in which the three-dimensional calibration equipment includes a light source, a holographic calibration plate, and two or more optical recorders.
Figure 29:
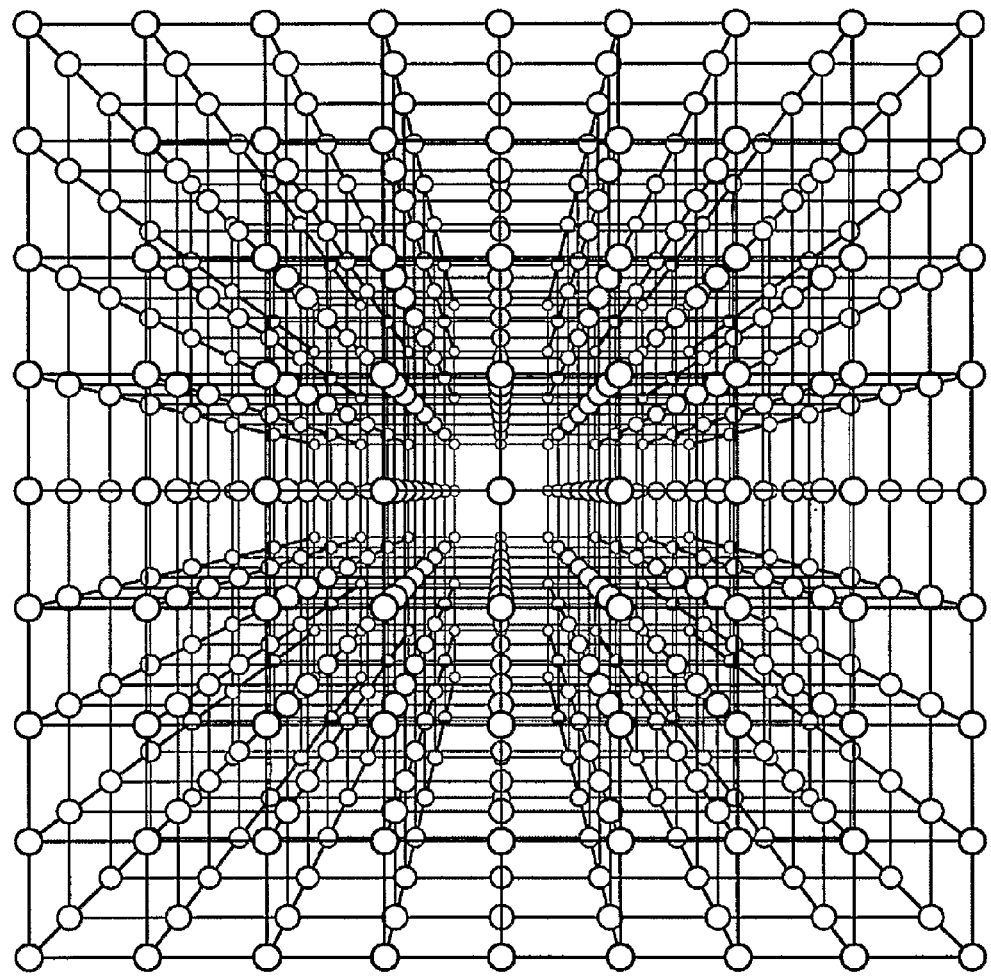
FIG. 29 is a perspective view of a cubical virtual calibration pattern in the form of a "tinker toy" like grid projected by a holographic calibration plate in the vicinity of a desired object.
Figure 30:
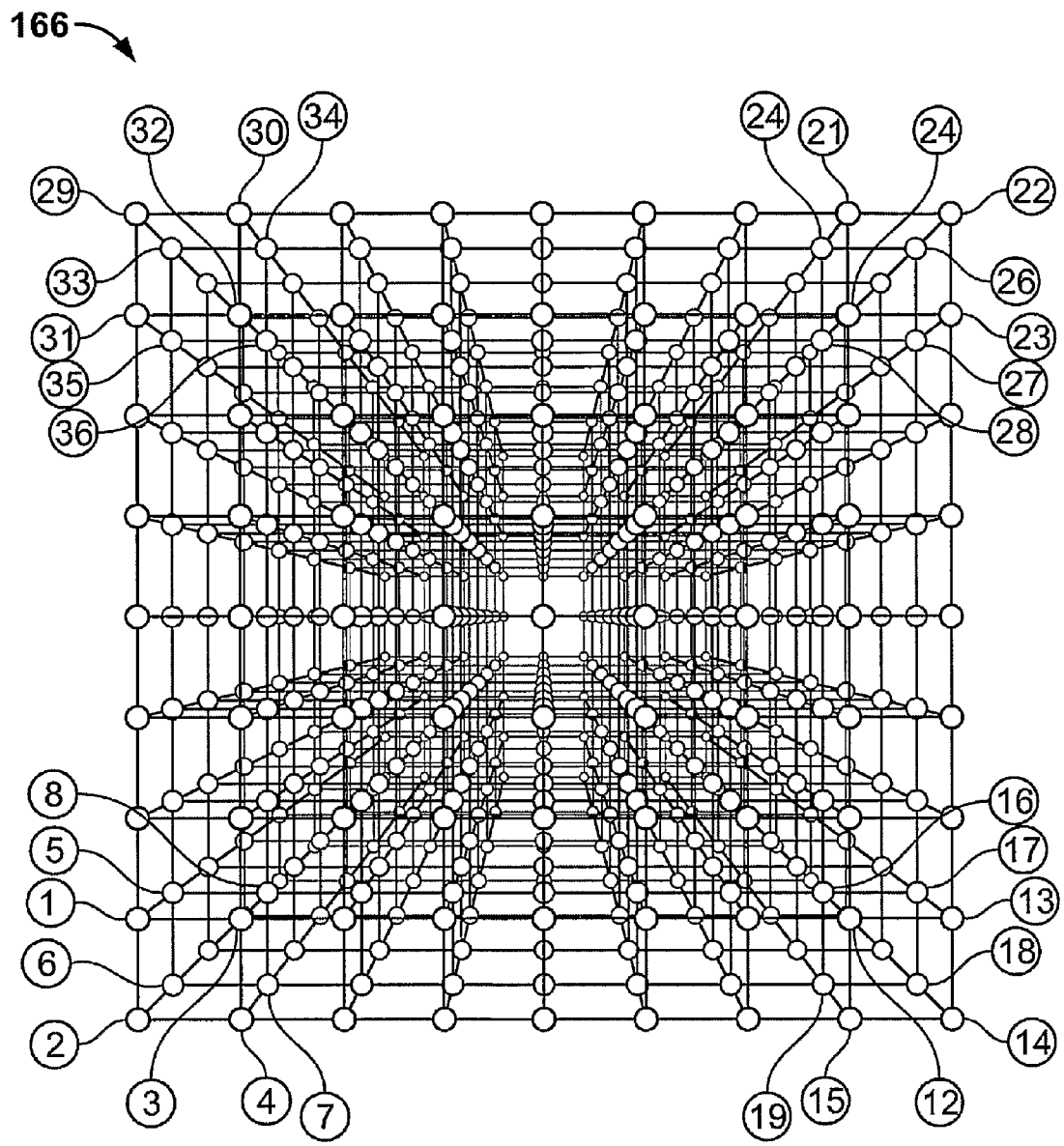
FIG. 30 is a perspective view of a cubical virtual calibration pattern of FIG. 29 in which individual intersections of the grid of the virtual calibration pattern are labeled with numerals.
Figure 31:
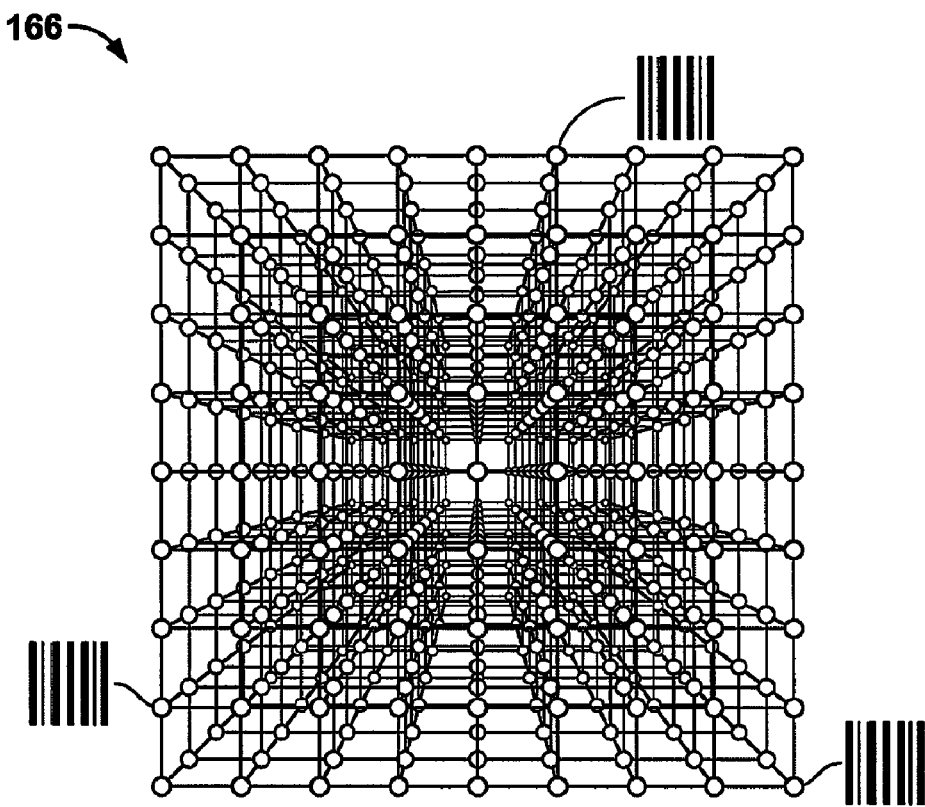
FIG. 31 is a perspective view of a cubical virtual calibration pattern of FIG. 29 in which individual intersections of the grid of the virtual calibration pattern are labeled with bar codes.
Figure 32:
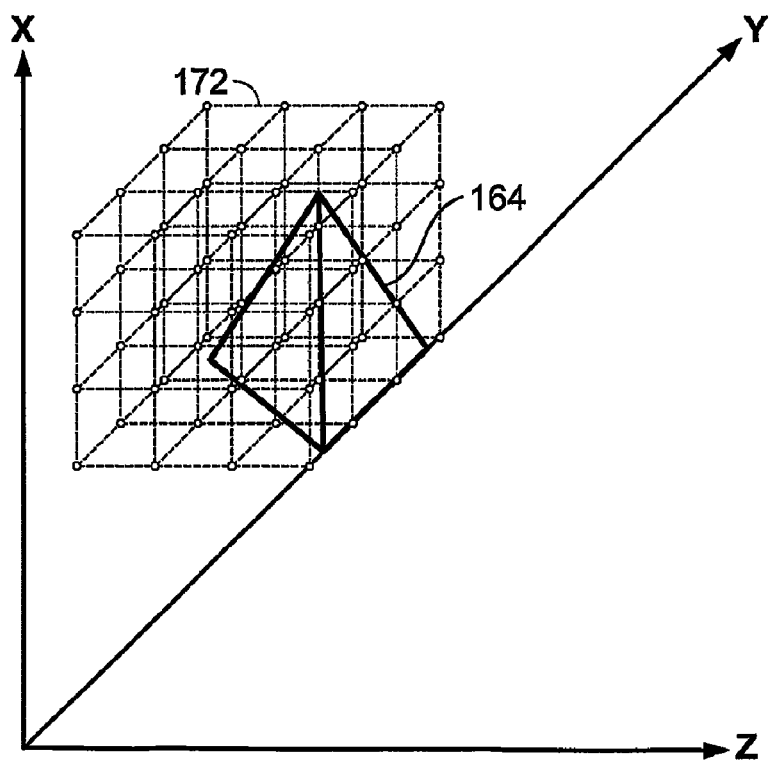
FIG. 32 is a schematic diagram showing how different calibration wavelengths can produce different grids for the virtual calibration pattern of varying density around the desired object, in this case a grid of low density.
Figure 33:
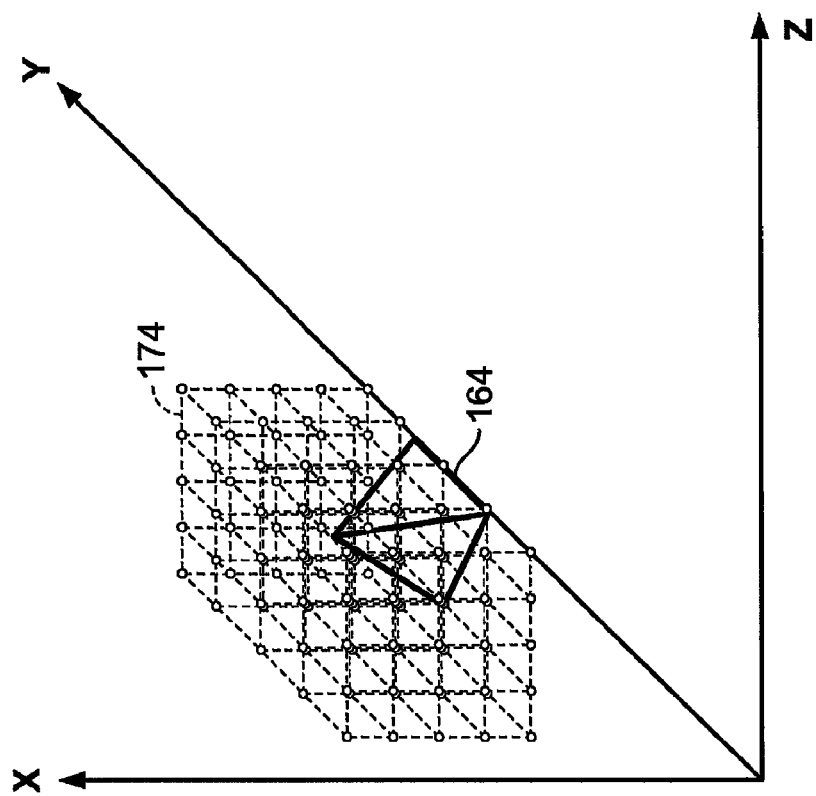
FIG. 33 is similar to FIG. 32 in which the grid is of medium and high density.
Figure 33:
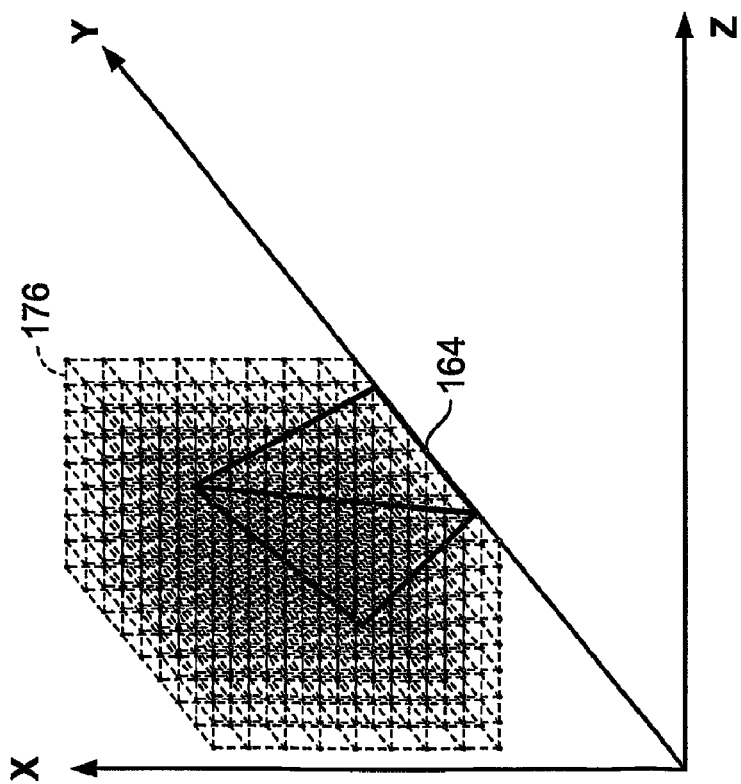

In the embodiments depicted in FIGS. 28 and 34, the optical recorders 162a-162c, 180a-180c can contain optics/electronics/software corresponding to elements of the block diagram depicted in FIG. 35. The optical recorders 162a-162c, 180a-180c includes optics 198, 200, optional wavelength selective filters 202, 204, and calibration electronics 222, 224, respectively. The calibration electronics 222, 224 can contain a processor (not shown) and output storage 218, 220 for storing information gleaned from the calibration wavelengths 170, 186 and output storage 206, 208 for storing information gleaned from the desired wavelengths 168, 192, respectively. An incoming desired image and calibration image 194, 196 enters each of the optical recorders 162a-162c, 180a-180c, respectively, and is separated into the desired wavelengths 168, 192 and the calibration wavelengths 170, 186 using the additional wavelength selective filters 202, 204, respectively. The desired wavelengths 168, 192 and the calibration wavelengths 170, 186 are processed separately in the calibration electronics 222, 224 as represented by the blocks 206, 208, and 210, 212, respectively. The resulting data are stored in separate parts of memory in the output storage 218, 220 and the output storage 206, 208, respectively.

Selective separation of the optical wavelengths can be accomplished in at least three ways. One way is to use the wavelength selective filters 202, 204. Another way is for the calibration electronics 222, 224 to be designed to implement optical-to-electronic conversion such as CCD arrays to separate the wavelengths. In this method the pixel array that provides optical-to-electronic conversion uses a planar arrangement of light sensitive devices whose arrangement in two dimensions alternates devices whose sensitivity peaks for the desired wavelengths 168, 192 and the calibration wavelengths 170, 186, respectively. Still another way is for the calibration electronics 222, 224 to be designed to implement optical band pass and band stop filters for selecting the desired wavelengths 168, 192 and the calibration wavelengths 170, 186, respectively.

Figure 36:
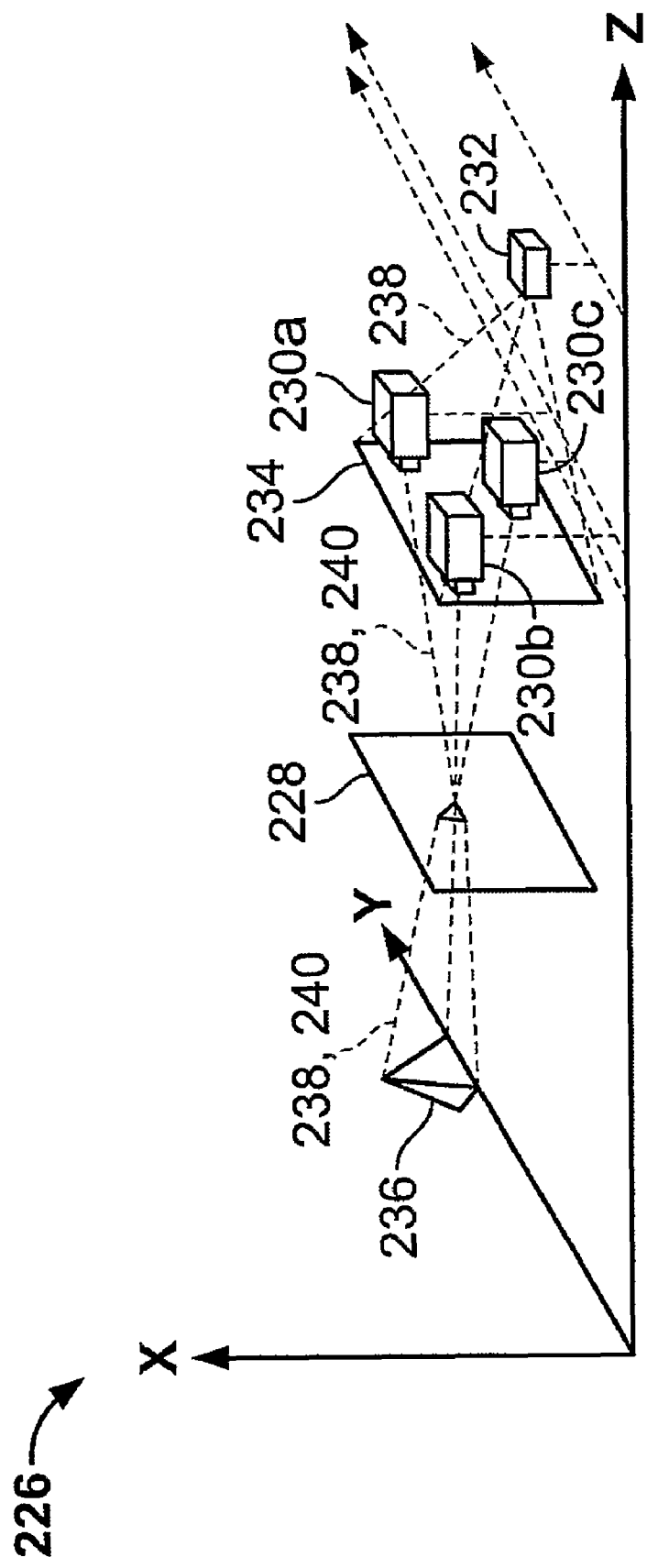
FIG. 36 is a schematic diagram of a third exemplary embodiment of the three-dimensional calibration equipment depicted in FIGS. 1 and 28, in which the three-dimensional calibration equipment also includes an optical or mechanical shutter.

Referring now to FIG. 36, a third exemplary embodiment of the three-dimensional calibration equipment 226 is depicted. The three-dimensional calibration equipment 226 includes an optical or mechanical shutter 228, optical recorders 230a-230c, a pulsed light source 232, and a holographic calibration plate 234. The optical or mechanical shutter 228 is placed between the holographic calibration plate 234 and the desired object 236. In this embodiment, the calibration wavelength(s) 238 are generated only for special frames. Frames imply that the recording of the desired wavelengths 240 and the calibration wavelengths 238 is broken into discrete units of time during which subsequent samples of the desired wavelengths 240 and the calibration wavelengths 238 are captured. Special frames store the calibration wavelengths 238. The special frames can be of two types. In one type, the special frames containing the calibration wavelengths 238 are stored or processed separately from the desired frames containing the desired wavelengths 240. In another type, the special frames are interspersed at a periodic or non-periodic rate between the desired frames.

During calibration, the pulsed optical source 232 is pulsed on with the optical or mechanical shutter 228 closed during the special frames. This arrangement enables the recording of desired and calibration information without wavelength separation. The three-dimensional calibration equipment 226 eliminates the need for wavelength selective filters, since multiple calibration patterns based on calibration wavelengths above and below the desired wavelengths 240 can be generated. In the embodiment of FIG. 36, the use of a pulsed optical source 232 and the optical or mechanical shutter 228 synchronized to the pulses can be adapted to provide pulsed time code information for synchronizing multiple optical recorders 230a-230c and/or to convey synchronized instructions to the multiple three-dimensional imaging systems (not shown) simultaneously, e.g. for special effects and other camera related functions. The combination of synchronization and holographic calibration/alignment across multiple cameras permits a more cost effective implementation of panoramic cameras such as those that are now implemented mechanically in CineMax® systems and the simplified construction of panoramic three-dimensional imaging systems.

Figure 37:
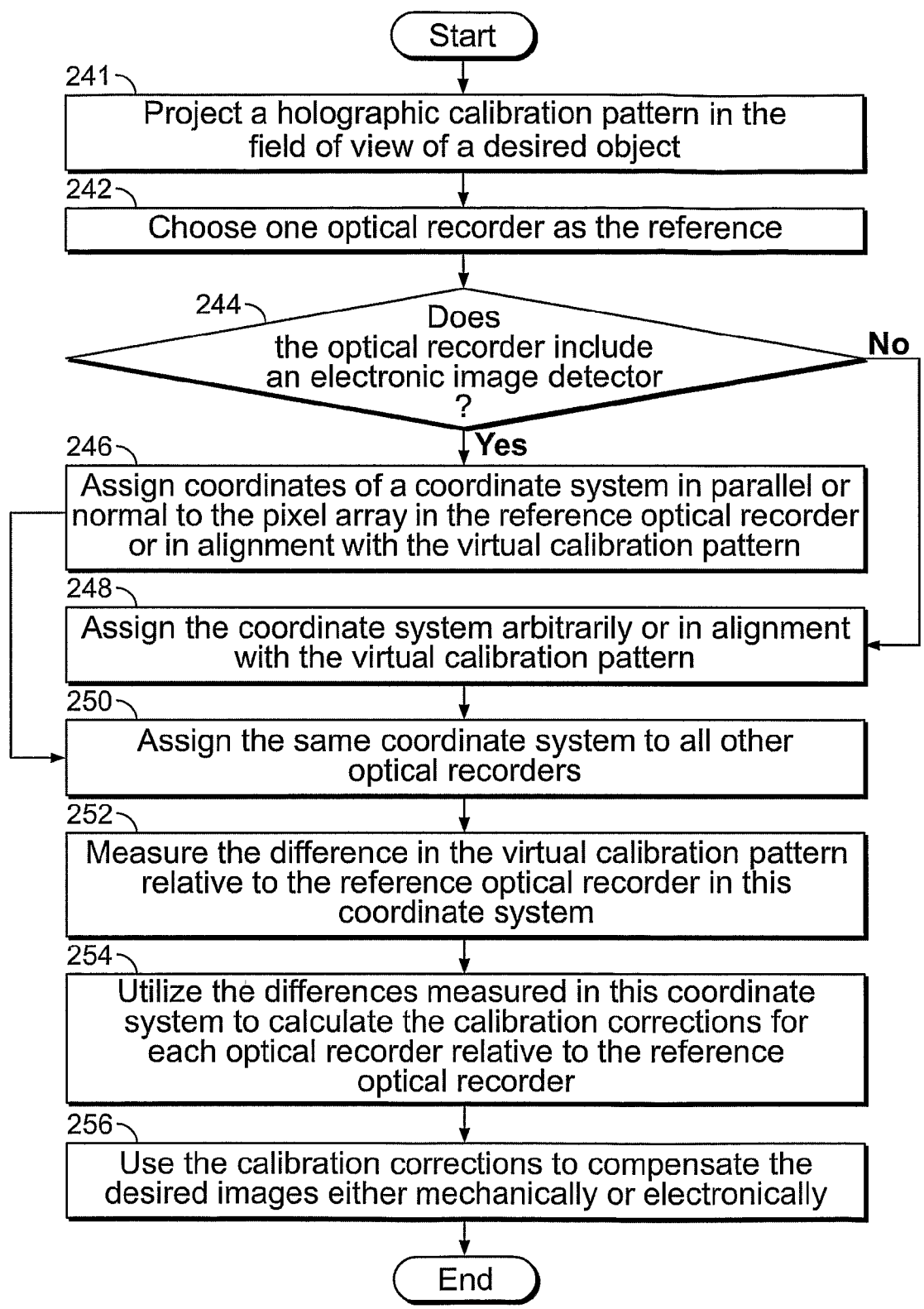
FIG. 37 is a flow chart depicting the method of calibration to be used in conjunction with the embodiments of the three-dimensional calibration equipment depicted in FIGS. 28, 34, and 36.

The embodiments of the three-dimensional calibration equipment 16, 177, and 226 described above generate an image of the desired object and an image of the virtual calibration pattern. Referring now to FIG. 37, for each mechanical configuration of the calibration equipment 16, 177, and 226 (e.g. physical position or optical magnification setting), the calibration method is as follows: At step 241, a virtual calibration pattern is projected in the field of view of a desired object. At step 242, one of the optical recorders is chosen as the reference. At step 244, if the optical recorder includes an electronic image detector, then at step 246, the coordinates of a coordinate system are assigned in parallel or normal to the pixel array in the optical recorder or in alignment with the virtual calibration pattern. If the optical recorder is a non-electronic system, then at step 248, the coordinates of a coordinate system are assigned arbitrarily or in alignment with the virtual calibration pattern. At step 250, the same coordinate system is assigned to all other optical recorders. At step 252, the differences in the virtual calibration pattern of each optical recorder other than the reference optical recorder is measured. At step 254, the differences measured are used to calculate the calibration corrections for each optical recorder relative to the reference optical recorder. At step 256, the calibration corrections are used to compensate the desired images either mechanically or electronically. The methodology of how to calculate the calibration corrections from the differences measured can be found in U.S. Pat. No. 6,822,748 to Johnston et al., which is incorporated herein by reference in its entirety. If there is only one optical recorder, then the method is modified such that the first position of the optical recorder becomes the reference and each subsequent position is treated in the calibration method as an additional optical recorder. Then the steps 241-256 are followed above.

Since a three dimensional system has three degrees of freedom, three adjustments are necessary: rotation, translation and scaling. In real time or by delayed processing, one of the non-reference optical recorders is mechanically or electronically (i) rotated so that the desired object appears to be twisted, (ii) translated so that the desired object appears to be moved left or right, and/or (iii) scaled (i.e. zoomed) so that the desired object appears to be made smaller or larger (equivalent in a singe camera view to moving it nearer or farther away).

Figure 38:
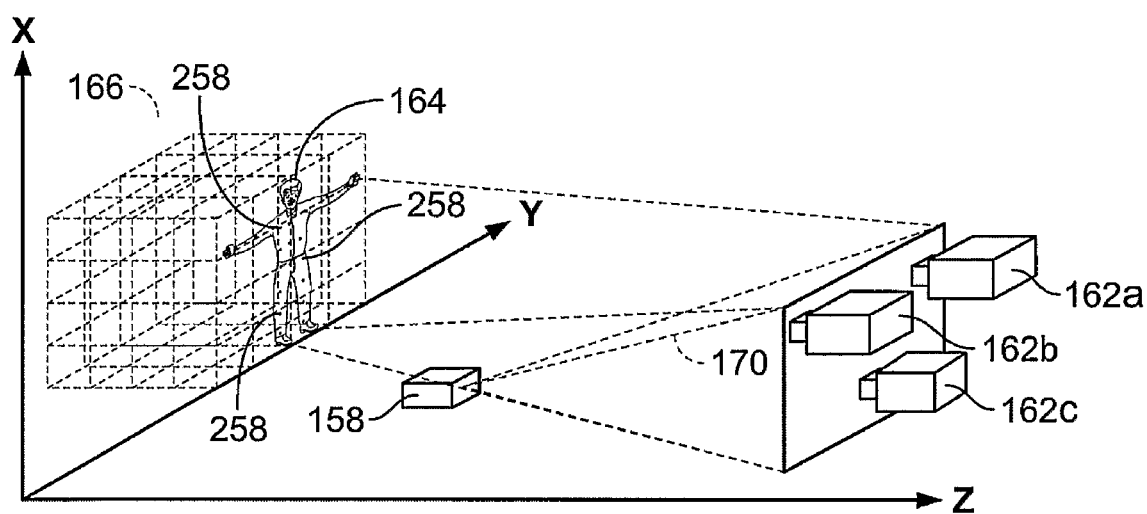
FIG. 38 is a schematic diagram of a variation of the embodiment of FIG. 28 in which the desired object has affixed to it calibration points which are painted with or reflective of the calibration wavelengths which are captured separately in the optical recorders.
Figure 39:
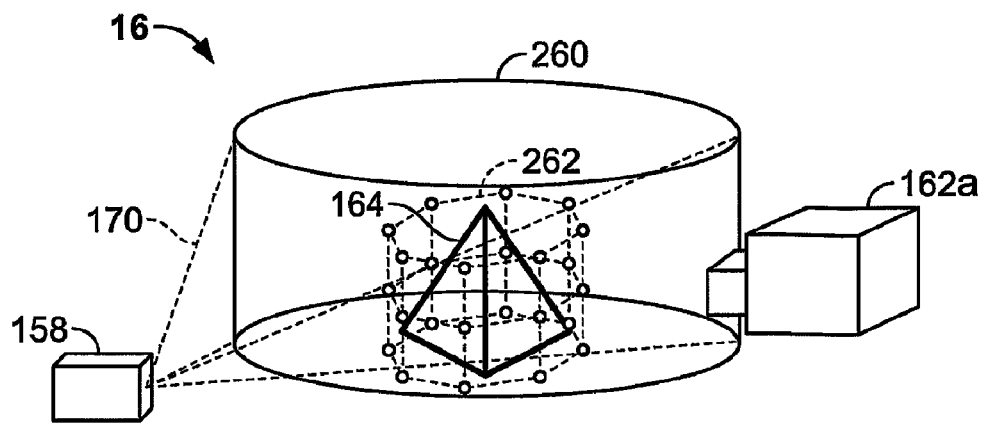
FIG. 39 is a schematic diagram showing an optical recorder located outside of the cylindrical holographic calibration plate, a position from which the optical recorder views a cylindrical virtual calibration pattern in its field of view.
Figure 40:
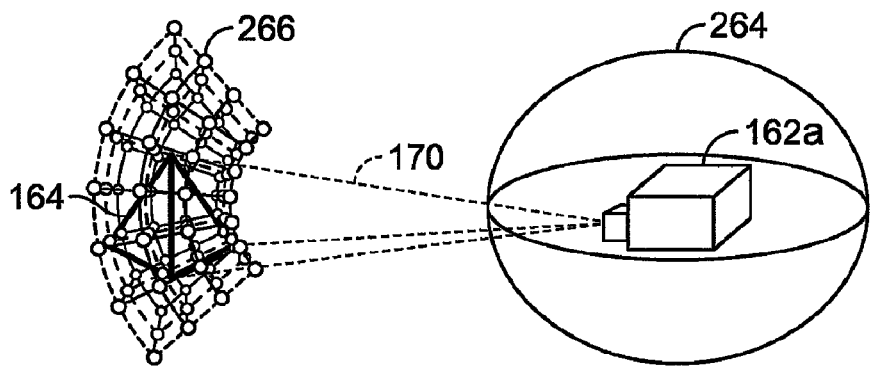
FIG. 40 is a schematic diagram showing an optical recorder located inside a spherical holographic calibration plate from which position a part of the spherical calibration grid is observable.

For the discussion which follows with reference to FIGS. 38-40, let the reference numbers for the three-dimensional calibration equipment 16 also stand for the corresponding reference numbers of the three-dimensional calibration equipment 177 and 226. The three-dimensional calibration equipment 16 permits the processing of the calibration wavelengths 170 separately from the desired wavelengths 168. If the desired object 164 has affixed to it calibration points 258 which are painted with or reflective of the calibration wavelengths 170 (see FIG. 38), then the calibration points 258 are captured separately in the optical recorders 162a-162c. Specific points on the desired object 164 are uniquely determined by highlight the desired points with points painted with materials that are reflective at the calibration wavelengths 170, which can be points where an application pattern is projected on to the desired object 164 using the calibration wavelengths 170 or with calibration points 176 attached to the object which are painted with the calibration wavelengths 170. For example, in order to measure a person for shoes or clothing, the person puts on a pair of socks or tights that are painted with an application pattern, e.g. grid, in one or more calibration wavelengths. The image matching for one or more optical recorders 162a-162c is precise at the calibration grid points. Alternatively, a cosmetic surgeon may paint a selected pattern on the patient using paint in a calibration wavelength that is not visible to the human eye to allow the surgeon to view normal visible images and the selected pattern of the patient in post processing for either still or full motion images. Surgeons may also use these techniques in conjunction with thermal images when the desired wavelengths are properly selected for radiological treatment applications where heat is generated by radioactive treatment materials.

Referring now to FIGS. 39 and 40, as discussed above, the virtual calibration pattern can have any desired shape, such as the shape of a cube, portions of concentric cylinders, portions of concentric spheres, etc., depending on the geometry of the desired object 164 and the field of view of one or more optical recorders. For the same reasons, the holographic calibration plate 178 can have any desired shape. A single optical recorder 162a or multiple optical recorders 162a-162c can use a rectangular, spherical, cylindrical or arbitrarily shaped hologram, illuminated by light source 158 from either the inside or outside of the holographic calibration plate that surrounds or partially surrounds the desired object 164. In FIG. 39, the optical recorder 164a moves around the outside of the cylindrical holographic calibration plate 260 through which a cylindrical virtual calibration pattern 262 is viewed. Successive images of the desired object 164 are post processed into a stereoscopic image or into a three-dimensional model of the object using algorithms for color and or edge matching. These stereoscopic images of the desired object 164 can be used to capture the three-dimensional shape of the desired object 164 by means of calculation by triangulation and the spatial position of uniquely determined points on the desired object 164, e.g., points for a wire frame model. Color, texture and shading are then applied to the wire frame model from the captured images of the desired object 164.

Referring now to FIG. 40, a spherical-shaped holographic calibration plate 264 is used in generating a partially spherical calibration hologram 266 of a partially-spherical calibration grid, i.e., a spherical coordinate grid, around one or more optical recorders 164a. The three-dimensional calibration equipment 16 of this configuration is well suited to applications requiring a complete field of view. Multiple optical recorders 164a-164c can be placed within the spherical holographic calibration plate 264 to simultaneously cover all directions. Such a spherical calibration hologram 266 provides the mechanism to overcome the problems of adjacent optical recording devices that record two-dimensional images, which include overlapping fields of view and conformal mapping from the planar segment of the optical recording device to a spherical frame of reference. Using a holographic calibration pattern in the form of a spherical coordinate grid in the field of view of the optical recorders enhances the conformal mapping of the multiple optical recorder outputs. The spherical calibration hologram 164 provides a matching point between the field of view of the adjacent optical recorders and provides a uniform coordinate system across all the optical recorders, which simplifies calibration and alignment of the optical recorders and simplifies conformal mapping across the optical recorders, especially when the alignment between such devices are vary due to shock, vibration or acceleration. The spherical calibration hologram 266, when combined with laser ranging to be discussed below in connection with FIG. 41, provides accurate ranging to a desired object 164.

The spherical holographic calibration configuration of FIG. 40 provides the three-dimensional calibration equipment 16 with the necessary data for generating a panoramic three-hundred sixty degree view of remotely piloted vehicles subject to shock or acceleration. The spherical holographic calibration configuration enables real-time compensation for the two major problems when providing a panoramic three-hundred sixty degree view for remotely piloted vehicles: (i) the continuous alignment of multiple "fisheye" optical recorders which are subject to misalignment by shock or vibration, and (ii) conformal mapping of multiple optical recorders into a three-hundred sixty degree panoramic view. Furthermore, the calibration wavelengths 170 can be chosen to include wavelength used in collision avoidance systems and thus process such information jointly with optical recorder calibration.

Figure 41:
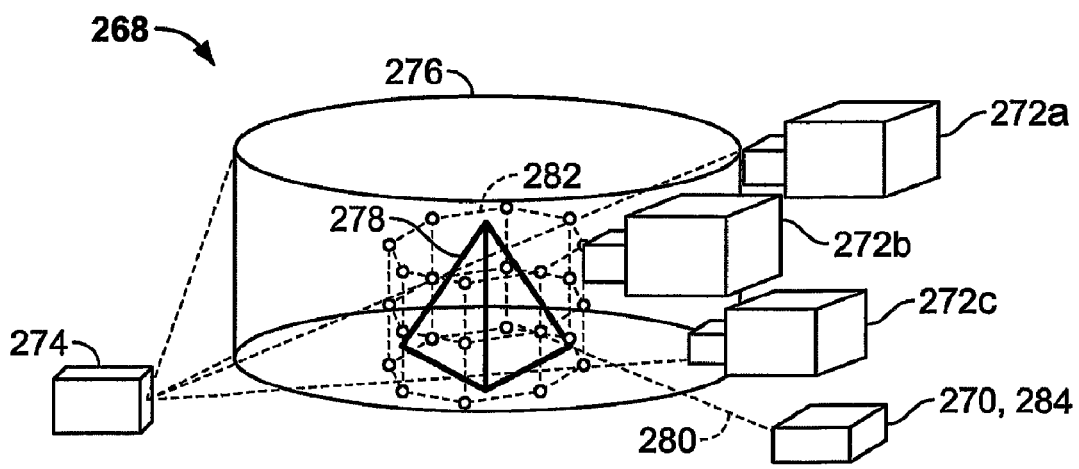
FIG. 41 is a schematic diagram of a fourth exemplary embodiment of the three-dimensional calibration equipment depicted in FIGS. 1 and 28, which includes three optical sources, a holographic calibration plate with an excitation source, and a laser pointer or laser ranging measurement device.

Referring now to FIG. 41, a fourth exemplary embodiment of the three-dimensional calibration equipment 268 is depicted. The three-dimensional calibration equipment 268 includes a laser pointer 270, optical recorders 272a-272c, a light source 274, and a cylindrical holographic calibration plate 276. The optical recorders 272a-272c separate the desired and calibration wavelengths to enable efficient extraction of the desired object's color in addition to its three dimensional shape. For the calibration equipment 268, the three optical recorders 272a-272c move around the outside of the cylindrical holographic calibration plate 276 in order to capture and triangulate the position in three-dimensional space of a point P on a desired object 278 which is illuminated by a laser pointer 270 operating at a calibration wavelength 280. This is an improvement over stereoscopic color matching or edge matching, as the point P is precise. Furthermore, when combined with holographic calibration technique of FIG. 38, the position of point P can be inferred from its position relative to a virtual calibration pattern 282. Since the processing of the object color information using the laser 270 is independent of processing of the spatial information using the virtual calibration pattern 282, the three-dimensional calibration equipment 268 is capable of capturing the object's shape. Although a desired object's shape and color can be recorded with a single optical recorder 272a, multiple optical recorders 272a-272c provides increased speed and accuracy.

Still referring to FIG. 41, the simple laser pointer 270 can be replaced with a laser ranging measurement device 284. The laser ranging measurement device 284 provides accurate ranges to any point P on the surface of the desired object 278. By choosing a wavelength for the laser ranging measurement device 284 that is a calibration wavelength, the point P illuminated by the laser ranging measurement device 284 is observable at the same time as the virtual calibration pattern 282. The embodiment of FIG. 41 uses the virtual calibration pattern 282 to position the laser pointer 270 or the laser ranging measurement device 284 at desired points on the virtual calibration pattern 282. In a calibration method for use with the three-dimensional calibration equipment 268 employing either the laser pointer 270 or the laser ranging measurement device 284, the virtual calibration pattern 282 is chosen to be a grid on a plane that intersects the desired object 278. The laser generated point P is to be positioned on the surface of the desired object 278 at grid points nearest to the spatial positions where the grid intersects the desired object 278.

Figure 42:
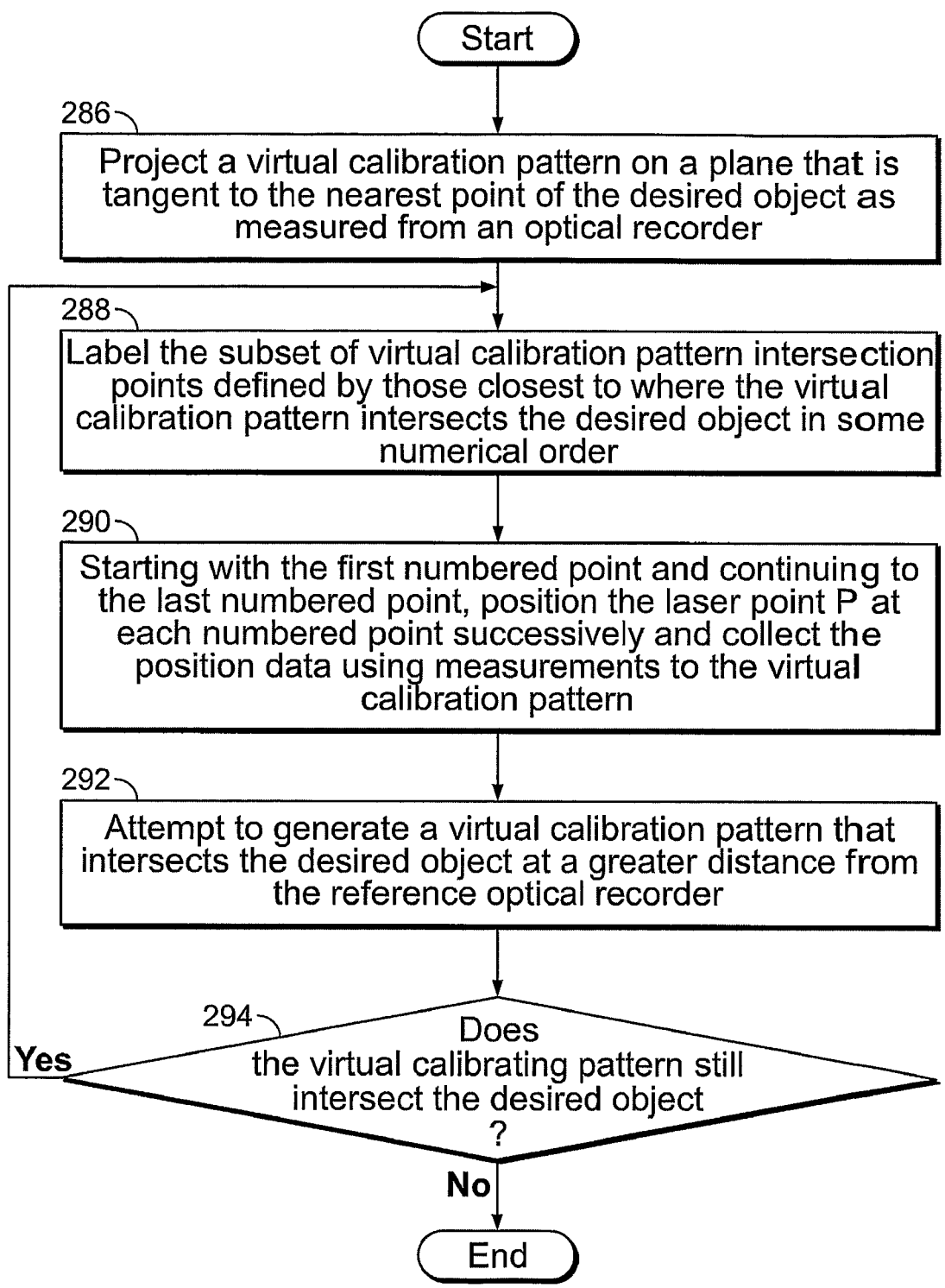
FIG. 42 is a flow chart depicting the method of calibration to be used in conjunction with the embodiment of the three-dimensional calibration equipment depicted in FIG. 41.

Referring now to FIG. 42, the calibration method for use with the three-dimensional calibration equipment 268 can be summarized as follows: At step 286, a virtual calibration pattern (object) 282 is projected on a plane that is tangent to the nearest point of the desired object 278 as measured from an optical recorder 272a-272c. At step 288, a subset of virtual calibration pattern intersection points defined by those points closest to where the virtual calibration pattern 282 intersects the desired object 278 is labeled in some numerical order. At step 290, starting with the first numbered point and continuing to the last numbered point, the laser point P is positioned at each numbered point successively and position data using measurements to the virtual calibration pattern 282 is collected. Step 290 simplifies the positioning process since the laser pointer wavelength is a calibration pattern wavelength and the pointer position P and the virtual calibration pattern 282 are simultaneously observable by the optical recorder 272a-272c for the laser pointer and thus relative positioning corrections rather than absolute position correction of the laser pointing system are required. At step 292, an attempt is made to generate another virtual calibration pattern that intersects the desired object 278 at a greater distance from the reference optical recorder. At step 294, if one can be generated, then steps 184-188 are repeated, otherwise stop.

Figure 43:
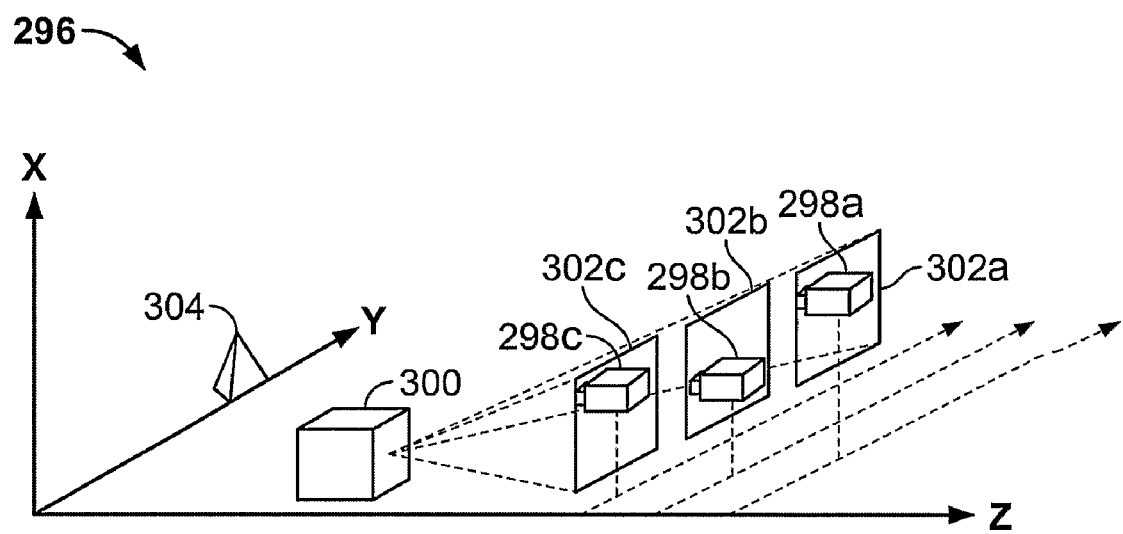
FIG. 43 is a schematic diagram of a fifth exemplary embodiment of the three-dimensional calibration equipment depicted in FIGS. 1 and 28, in which the three-dimensional calibration equipment employs non-continuous, identical holographic calibration plates instead of a single continuous holographic calibration plate.

Referring now to FIG. 43, a fifth exemplary embodiment of the three-dimensional calibration equipment 296 is depicted. The three-dimensional calibration equipment 296 includes optical recorders 298a-298c, a light source 300, and non continuous, identical holographic calibration plates 302a-302c. If the holographic calibration plates 302a-302c were held mechanically parallel, then this configuration would effectively be the configuration of the three-dimensional calibration equipment 16. Misalignment of the holographic calibration plates 302a-302c shifts the calibration pattern up or down, left or right and/or forward or back. Thus the misalignment may be calculated from a set of reference points in the field of view. These points my be known calibration points, such as fixed points in the field of view, points projected by a laser whose wavelength is a calibration wavelength, or some distinctive feature of the desired object 304 such as an edge or point of a distinct color.

Figure 44:
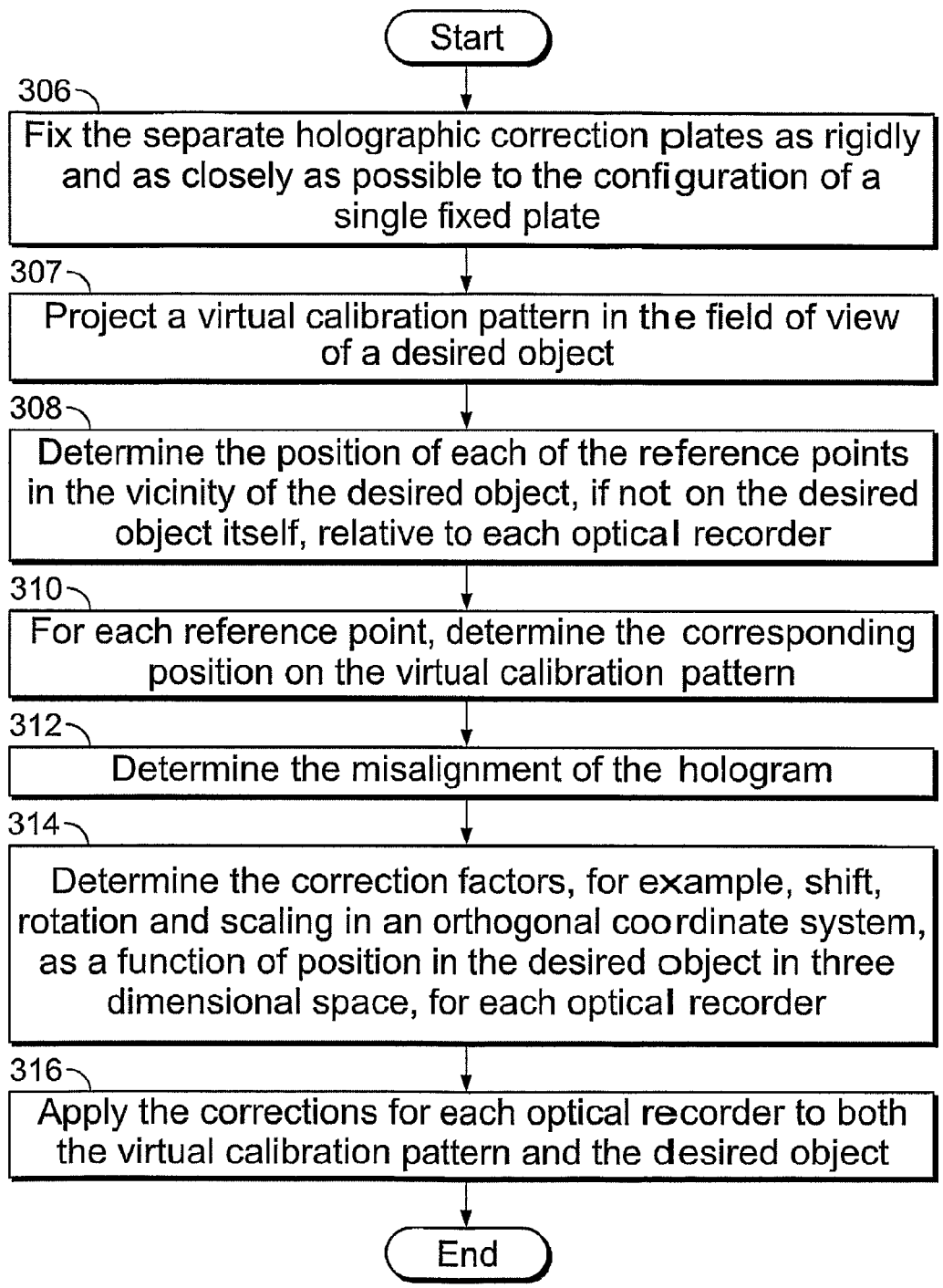
FIG. 44 is a flow chart depicting the method of calibration to be used in conjunction with the embodiment of the three-dimensional calibration equipment depicted in FIG. 43.

Referring now to FIG. 44, the calibration method for use with the three-dimensional calibration equipment 296 can be summarized as follows: At step 306, the separate holographic correction plates 302a-302c are fixed as rigidly and as closely as possible to the configuration of single fixed plate For flat calibration plates, this implies initially fixing the non-contiguous plates as parallel to each other as possible. For cylindrical/spherical segmented non-contiguous plates, this implies initially fixing the plates rigidly as close to the location at which a contiguous cylindrical/spherical plate would occupy, and so forth for other shapes of holographic plates (e.g., elliptical). At step 307, a virtual calibration pattern is projected in the field of view of a desired object 304. At step 308, the position of each of the reference points in the vicinity of the desired object 304, if not on the desired object 304 itself, relative to each optical recorder, is determined. Illuminated points on the desired object 304 are a subset of the reference points. Additional fixed calibration points are generated by affixing reflecting and/or absorbing colors to the desired object 304 with wavelengths in the calibration range, thus predetermining a fixed set of points for calibration. At step 310, for each reference point, the corresponding position on the virtual calibration pattern is determined. At step 312, from the data of step 310, the misalignment of the virtual calibration pattern is determined. At step 314, the correction factors, for example, shift, rotation and scaling in an orthogonal coordinate system, as a function of position in the desired object 304 in three-dimensional space, for each optical recorder, is determined. At step 316, the corrections are applied for each optical recorder to both the virtual calibration pattern and the desired object.

Figure 45:
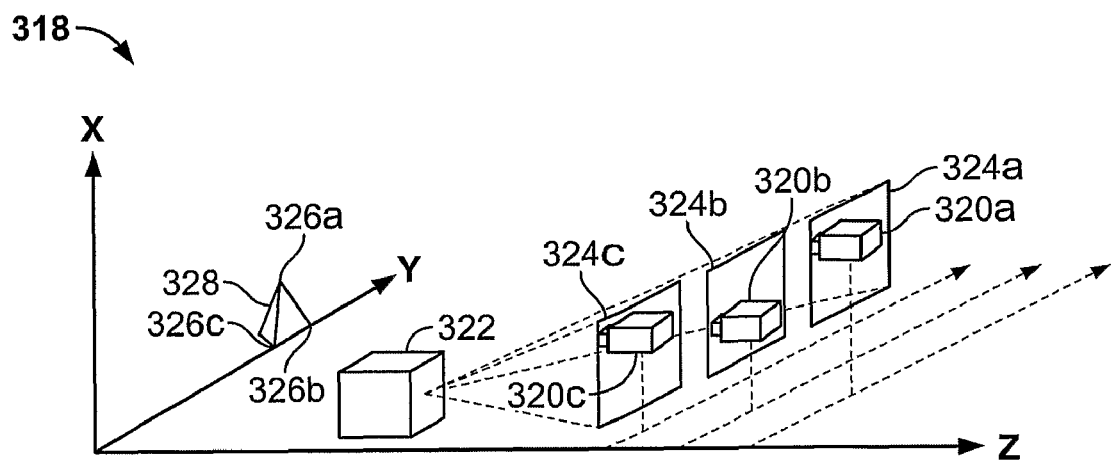
FIG. 45 is a schematic diagram of a sixth exemplary embodiment of the three-dimensional calibration equipment depicted in FIGS. 1 and 43, in which the three-dimensional calibration equipment also includes reference points identified by the calibration equipment in the field of view of the desired object.

Referring now to FIG. 45, a sixth exemplary embodiment of the three-dimensional calibration equipment 318 is depicted. The three-dimensional calibration equipment 318 includes optical recorders 320a-320c, a light source 322, non continuous, identical holographic calibration plates 324a-324c, and reference points 326a-326b in the field of view of the desired object 328. The three-dimensional calibration equipment 318 is realizable for applications that do not utilize the patterns of the virtual calibration plate 324a-324c. Specific reference points 326a-326c in the field of view of the desired object 328 are illuminated by a remote source (not shown) or self illuminated with calibration wavelengths. The reference points 326a-326c are separated into calibration wavelengths by the electronics (not shown) and are used to provide calibration across the optical recorders 320a-320c and provide the calibration for compensation of the desired object 328, i.e., in some circumstances, fixed calibration points near or on the desired object may replace the holographic calibration plates.

Figure 46:
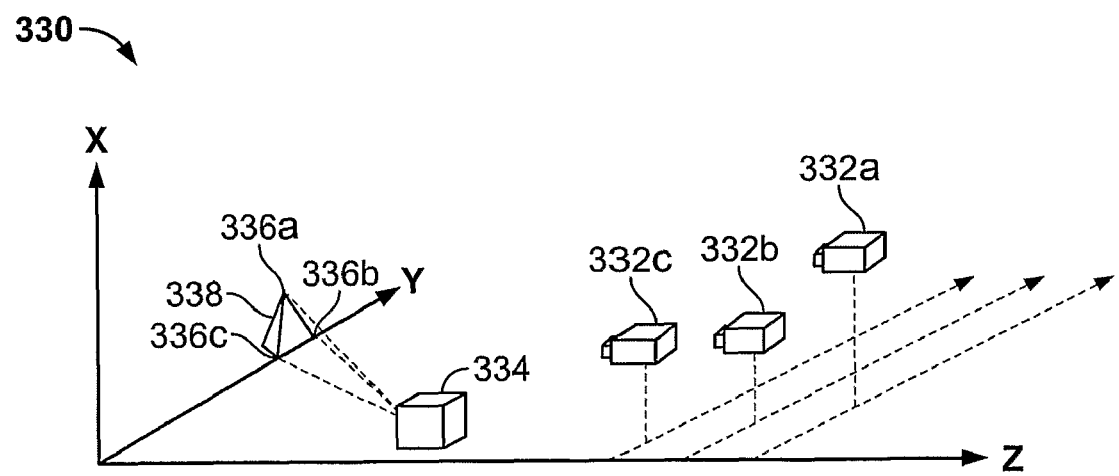
FIG. 46 is a schematic diagram of a seventh exemplary embodiment of the three-dimensional calibration equipment depicted in FIGS. 1 and 44, in which the three-dimensional calibration equipment does not utilize fixed calibration plate(s)

Referring now to FIG. 46, a seventh exemplary embodiment of the three-dimensional calibration equipment 330 is depicted. The three-dimensional calibration equipment 330 includes optical recorders 332a-332c, a remote light source 334, and reference points 336a-336b in the field of view of the desired object 338. The three-dimensional calibration equipment 330 is applicable to applications that do not utilize the patterns of a fixed calibration plate, or in applications where specific reference points 336a-336c can be illuminated by a remote light source 334 or self illuminated with calibration wavelengths. A holographic calibration plate is not required. What is required is only those elements of the three-dimensional calibration equipment 330 that separate the desired object wavelengths from calibration wavelengths. The calibration corrections are calculated from known points 336a-336c illuminated by the calibration wavelengths for each of the optical recorders 332a-332c and calibration corrections are applied to each object in each of the optical recorders 332a-332c. This simplified calibration and compensation method is more likely to be employed in wide angle images that uniformly capture many fixed calibration sources and where the fixed points 336a-336c are affixed to the desired object 338 or placed near stationary desired objects.

Figure 47:
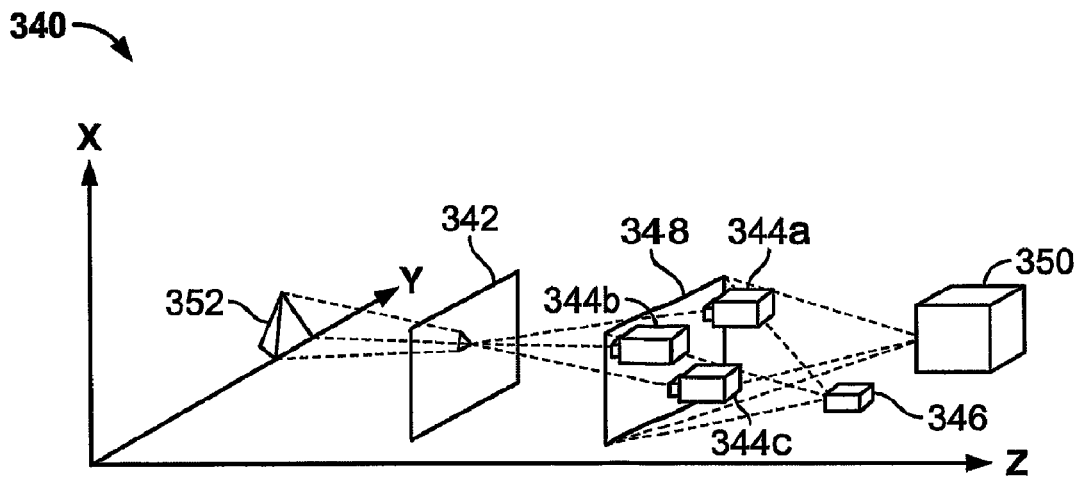
FIG. 47 is a schematic diagram of an eighth exemplary embodiment of the three-dimensional calibration equipment depicted in FIGS. 1 and 28, in which the three-dimensional calibration equipment also includes a band stop filter.

Referring now to FIG. 47, an eighth exemplary embodiment of the three-dimensional calibration equipment 340 is depicted. The three-dimensional calibration equipment 340 includes a band stop filter 342, optical recorders 344a-344c, a light source 346, and a holographic calibration plate 348. Essentially, the band stop filter 342 is added to the calibration equipment 16, which prevents the illumination wavelength(s) of intruding hologram source(s) 350 from traveling to the region in the vicinity of the desired object 352 via the region in the vicinity of the holographic calibration plate 348 and the optical recorders 344a-344c. Such emanations from the intruding hologram source(s) 350 are undesirable when the three-dimensional calibration equipment 340 is used in a security or a surveillance application.

Figure 48:
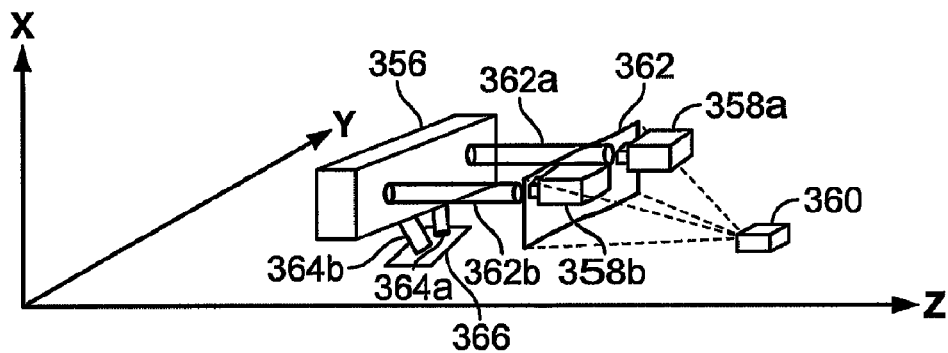
FIG. 48 is a schematic diagram of a ninth exemplary embodiment of the three-dimensional calibration equipment depicted in FIG. 1, in which the three-dimensional calibration equipment is used in conjunction with a stereoscopic microscope.

Referring now to FIG. 48, a ninth exemplary embodiment of the three-dimensional calibration equipment 354 is depicted. The three-dimensional calibration equipment 354 includes a stereoscopic microscope 356, optical recorders 358a, 358b a light source 360, and a holographic calibration plate 362. FIG. 48 shows an apparatus which generates virtual holograms for the stereoscopic microscope 356. Calibration of the stereoscopic microscope 356 can be useful when multiple optical paths 362a, 362b are employed. Potential uses of calibration for the stereoscopic microscope 356 include projecting three-dimensional grids in the field of view of the lenses 364a, 364b of the stereoscopic microscope 356 to assist in counting specimens such as while blood cells on microscope slides 366 or to ascertain the locations of imperfections in diamonds as a means of grading and identification in the case of theft. The use of three-dimensional holograms permits improved analysis as stereoscopic microscope images are scaled, especially in the depth dimension. When multiple virtual calibration patterns (not shown) are recorded by the optical recorders 358a, 358b on the holographic calibration plate 362 after being illuminated by an optical source 360, the multiple virtual calibration patterns are selectively accessed as the wavelength of illumination of the holographic calibration plate 360 is varied or by movement of the holographic calibration plate 360. For the three-dimensional calibration equipment 354, one calibration wavelength is used to record a virtual calibration pattern and another calibration wavelength is used to symbolically identify the pattern (grid) intersection, e.g. a bar code or alphanumeric sequence. Additional wavelengths are used for illuminating holographic calibration grids (virtual calibration patterns) with finer grid structures for more accurate determination of three-dimensional spatial positioning. Combining the holographic calibration plate 360 with a holographic calibration grid with marked symbolic identification such a bar code decreases the time for real time recognition of grid intersections by commercial software.

Figure 49:
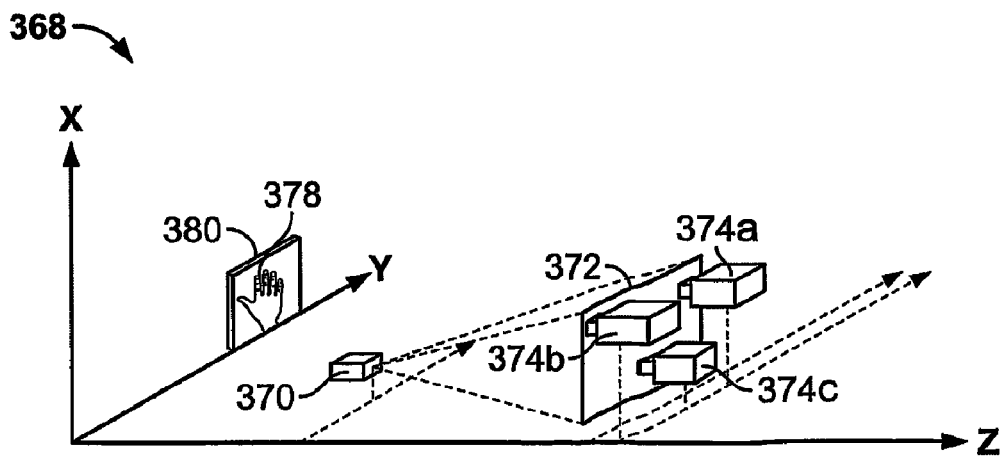
FIG. 49 is a schematic diagram of a ninth exemplary embodiment of the three-dimensional calibration equipment depicted in FIGS. 1 and 28, in which the three-dimensional calibration equipment also includes a desired object imprinted on a plate in which the desired object is identified using a combination of characteristics.

Referring now to FIG. 49, a tenth exemplary embodiment of the three-dimensional calibration equipment 368 is depicted. The three-dimensional calibration equipment 368 includes a light source 370 which excites the holographic calibration pattern, a holographic calibration plate 372 that contains holographic encoded calibration information, two or more optical recorders 374a-374c which acquire images in different optical wavelengths. The light source 370 may be placed on either side of the holographic calibration plate 372. This embodiment projects holographic calibration patterns into the field of view of multiple optical recorders which acquire images in different optical wavelengths in order to capture multiple views referenced to common calibration patterns. The three-dimensional calibration equipment 368 is used for identifying the desired object 378 using a combination of characteristics. For example, these characteristics include unique object identifiers (e.g. finger prints), object geometry (e.g. hand geometry) and/or object substructures (e.g. veins viewed at non-visible wavelengths). The wavelength selective filters 202 and 204 enhance selection of identification characteristics. For example, a band stop filter which only passes the infrared wavelengths is most useful for vein identification. The filters may be selected in real time using opto-acoustic implementations for the wavelength selective filters to select a particular eye or hair color corresponding to a specific desired object(s) 378 for which an identification is desired. The three-dimensional calibration equipment 368 minimizes post processing by the use of band pass and band stop optical filters and/or continuous holographic calibration and correction, which speeds up the matching of the desired object 378.

The exemplary embodiment of the three-dimensional calibration equipment 368 can be employed in banking where the underlying identification objectives are to: (1) minimize false acceptances and (2) minimize false rejections. The multi-criteria identification system shown in FIG. 49 can apply low false rejection criteria (e.g. hand geometry) to low risk activities (e.g. balance checks) and apply low false acceptance criteria (finger print, vein structure, etc.) to high cost of failure activities (e.g. funds withdrawal).

The present invention has several advantages over the prior art three-dimensional imaging system. For the three-dimensional display 12, when ultra short optical pulses are employed, the ultra short optical pulses converge at very precise locations on the optical mixer 18, thereby creating high precision, high definition images in the display volume 28. The optical mixer elements 20a-20i can be varied in size, allowing the three-dimensional display 12 to be scalable from very small to very large displays. There is no inherent size limitation. The optical mixer element layout can be optimized to prevent unintended pulse overlap from creating unintended outputs. The optical mixer 18 is capable of being viewed at high refresh rates. Since the three-dimensional display 12 is operable using optical pulses 32a-32k that are in visible and non-visible wavelengths, the three-dimensional display 12 can be used as test equipment for both the three-dimensional image scanner 14 and the two-dimensional image scanner 15. The display electronics 24 allows for (i) the simultaneous excitement of voxels in the display volume, (ii) dynamic adjustment of the intensity of the light produced in a voxel in the display volume 28, and (iii) the selection of optical source combinations for each voxel. These three characteristics of the display electronics 24 achieve the needed conversion efficiency in the optical mixer 18 to produce equalization of intensity throughout the display volume 28. Using intense optical pulses 32a-32k to excite the optical mixer 18 increases voxel intensity in the display volume 28 and thereby increases viewing angles, including angles close to the plane of the display 12. Increased viewing angle is also achieved when the optical mixer elements 20a-20i employ lenses, since the cone of acceptance of each of the optical mixer elements 20a-20i increases over an element without a lens. Using optical mixer elements 20a-20i without filters reduces the cost of the overall optical mixer 18.

Compared to three-dimensional image scanners in the prior art, which capture only shape, the three-dimensional image scanner 14 captures shape, color and texture simultaneously in real-time.

The three-dimensional calibration equipment herein described provides continuous (real time) calibration of stereoscopic information from still or moving objects. It improves the quality of the stereoscopic images and permits the construction of more accurate three-dimensional models from such images. The three-dimensional calibration equipment can operate in real time, for both optical and electronic based optical recorders. The three-dimensional calibration equipment improves the quality of the stereoscopic images, for example, by more accurately combining information from multiple optical recording devices. The three-dimensional calibration equipment is both an apparatus to use with image capture equipment such as cameras and a method to compensate for the absolute and/or differential distortion within and across stereoscopic imaging equipment used together as a system.

By employing a holographic projection technique that creates a virtual calibration pattern in the desired object space, the three-dimensional calibration equipment automates the calibration process. As the virtual calibration pattern is viewed by the same lens system in optical recorders that are used for stereoscopic imaging systems, all static distortion will be taken into account. The virtual calibration pattern allows explicit calibration in the desired object's space without the limitations of using real calibration patterns that are moved through the image space.

One potential use of the higher quality images obtained from the three-dimensional calibration equipment is to more accurately determine the distance to points on the stereoscopically recorded or viewed desired object for uses which include the construction of three dimensional images of desired object. As the three-dimensional calibration equipment is capable of providing calibration during normal stereoscopic operation without affecting the desired image, it is usable for continuous calibration, e.g., when the optical recorders are equipped with variable zoom lenses that exhibit differing optical properties as the zoom setting is changed, or continuous calibration during normal operation when mechanically misalignment of equipment occurs in one or more of the optical paths to the optical recorders. The three-dimensional calibration equipment continuously operates without interfering with the optical recorders.

By changing the virtual calibration patterns, for example, by varying the hologram frequency when alternative holograms are recorded at different frequencies, several ranges and positions of the image field of view can be continuously recalibrated to compensate for variations in image system distortions (e.g., as the degree of telephoto magnification is changed). With the three-dimensional calibration equipment, a virtual calibration pattern can be produced in any place in the field of view of the optical recorders, and the calibration is done quickly. Compared with other calibration systems, the desired information and the calibration information are recorded through the same lens of each image recorder as the desired image is captured at the same time as the calibration image, which enables real time or post-processing calibration.

The three-dimensional calibration equipment herein described can operate in real-time and at high speeds, which makes the equipment suitable for applications in which traditional calibration equipment is not suitable, such as in the cockpit of an aircraft, where it is not possible to place a traditional calibration object in field of view. This is especially true when the optical recorders are subject to acceleration or other causes of changes in the optical paths between the desired object and the optical recorders. Having a single frame of reference with known points in the calibration pattern observable in each view simplifies combining multiple camera views to create to produce a three-dimensional representation of a desired object. The three-dimensional calibration equipment of the present invention simplifies conformal mapping from a planar optical recorder to a non-planer coordinate system—holographic project enables each optical recorder to view the same desired coordinate system, e.g., spherical, simplifying point matching and transformation. Computer readable labeling of holographic pattern intersections provides improved performance as identification of points in the field of view is simplified compared to the searching and matching operations performed in the prior art. The calibration equipment of the present invention can make use of multiple patters, slightly shifted patterns, or patterns with more fine detail to capture different views of the desired object. The calibration equipment 268 which employs a laser ranging measurement device 284 is quicker and more precise than traditional triangulation from two optical recorders. The discrete holographic calibration plates of the calibration equipment 318 are lower in cost and less susceptible to vibrations present in moving vehicles compared to using a single calibration plate spanning all optical recorders. When the calibration equipment 354 is used in combination with the stereoscopic microscope 356, the calibration equipment 354 permits the stereoscopic microscope 356 to capture multiple biometric views from optical recorders with a common virtual calibration pattern.

It will be understood that the embodiments described herein are merely exemplary and that a person skilled in the art may make many variations and modifications without departing from the spirit and scope of the invention. All such variations and modifications are intended to be included within the scope of the present invention as defined in the appended claims.

What is claimed:

1. A method for calibrating a three-dimensional imaging system having an optical apparatus for capturing an optical image of an object from at least a first position and a second position, comprising the steps of:
   projecting a virtual calibration pattern in the field of view of the object in relation to the optical apparatus in the first position and in the second position;
   capturing an optical image of the object together with an optical image of the virtual calibration pattern from the first position and from the second position;
   choosing one of the first position and the second position of the optical apparatus as a reference position;
   assigning coordinates of a coordinate system relative to either the virtual calibration pattern or the reference position;
   measuring differences in the virtual calibration pattern in the coordinate system from the first position to the second position of the optical apparatus;
   calculating calibration corrections relative to the reference position based on spatial locations and orientations of voxels in the reference position in relation to the optical image of the virtual calibration pattern; and
   adjusting images from the optical apparatus based on the calibration corrections.

2. The method of claim 1 further including the step of assigning the coordinate system at the second position.

3. The method of claim 2, wherein the optical apparatus includes a single optical recorder that moves between a reference and a displaced position.

4. The method of claim 3, wherein said single optical recorder is a three-dimensional camera.

5. The method of claim 3, wherein said single optical recorder is a two-dimensional camera.

6. The method of claim 3, wherein said single optical recorder includes an electronic imaging detector comprising a pixel array and said step of assigning coordinates is either in parallel to the pixel array or normal to the pixel array.

7. The method of claim 2, wherein the optical apparatus includes at least two optical recorders, one of which is located at a reference position and another of which is located at a displaced position.

8. The method of claim 7, wherein said at least two optical recorders are three-dimensional cameras.

9. The method of claim 7, wherein said at least two optical recorders are two-dimensional cameras.

10. The method of claim 7, wherein said at least two optical recorders include an electronic imaging detector comprising a pixel array and said step of assigning coordinates is either in parallel to the pixel array or normal to the pixel array.

11. The method of claim 2, wherein said step of assigning coordinates is in alignment with the virtual calibration pattern.

12. The method of claim 2, wherein the coordinates are assigned arbitrarily.

13. The method of claim 2, wherein said adjusting step is performed mechanically or electronically.

14. The method of claim 4, 5, or 6, wherein at least one laser ranging device illuminates and measures distances to points on the desired object using at least one calibration wavelength.

* * * * *